United States Patent [19]
Freiburg et al.

[11] Patent Number: 5,349,647
[45] Date of Patent: Sep. 20, 1994

[54] INPUT/OUTPUT COPROCESSOR FOR PRINTING MACHINE

[75] Inventors: Joseph A. Freiburg, Rochester; Isaak Rivshin, Pittsford, both of N.Y.

[73] Assignee: Xerox Corporation, Stamford, Conn.

[21] Appl. No.: 190,387

[22] Filed: Feb. 2, 1994

Related U.S. Application Data

[62] Division of Ser. No. 812,314, Dec. 23, 1991, Pat. No. 5,307,458.

[51] Int. Cl.⁵ .............................................. G06F 3/12
[52] U.S. Cl. ................................. 395/115; 395/116; 395/163; 395/164; 395/166
[58] Field of Search ............... 395/114, 115, 116, 162, 395/163, 164, 166, 101; 345/201

[56] References Cited

U.S. PATENT DOCUMENTS 4,803,617  2/1989  Berarducci ..................... 395/800

FOREIGN PATENT DOCUMENTS

262603A2  4/1988  European Pat. Off. .
WO8901664  2/1989  PCT Int'l Appl. .
2166620A  5/1986  United Kingdom .

Primary Examiner—Robert L. Richardson
Attorney, Agent, or Firm—Gary B. Cohen

[57] ABSTRACT

In accordance with the present invention, an improved printing machine for concurrently processing first and second sets of image data is provided. The printing machine preferably comprises a video processor, capable of processing the first set of image data, a system memory, adapted to store the second set of image data, and a bus for transmitting image data, addresses and control data thereacross. Both of the video processor and the system memory are coupled with the bus. Additionally, an apparatus for transferring the second set of image data between the input/output device and the system memory substantially concurrent with the first set of image data being processed in the video processor is provided. The transferring apparatus preferably transfers the second set of image data in response to receiving a signal from the input/output device.

21 Claims, 19 Drawing Sheets

INPUT/OUTPUT COPROCESSOR FOR PRINTING MACHINE

This a division of application Ser. No. 07/812,314, filed Dec. 23, 1991 and now U.S. Pat. No. 5,307,458.

BACKGROUND OF THE INVENTION

1. Cross-Reference to Related Application

The subject matter of the present case is related to copending patent application Ser. No. 07/784,493, filed Oct. 29, 1991, now U.S. Pat. No. 5,261,047 entitled Bus Arbitration Scheme For Facilitating Opeation of a Printing Apparatus, to patent application Ser. No. 07/784,481, filed Oct. 29, 1991, now U.S. Pat. No. 5,303,341, entitled Video Processor for a Printing Apparatus, and to patent application Ser. No. 07/784,195, now U.S. Pat. No. 5,276,799 entitled Expandable Electronic Subsystem for a Printing Machine. The pertinent portions of each are incorporated herein by reference.

2. Field of the Invention

The present invention relates generally to an a printing machine, and more particularly to a coprocessing apparatus adapted for use in the printing machine.

3. Description of the Prior Art

It is now well accepted that electronic reprographic systems, such as Canon's NP-9030 digital copying apparatus, have certain distinct advantages over known light-lens systems. The NP-9030 was one of the first electronic reprographic systems to be marketed with the capability to convert an optical image from a scanned original to image intensity signals, and reconstruct the signals, by way of a print engine using a pulsed diode laser. Because of the many image processing capabilities of the electronic reprographic system, which allows for, among other things, cut and paste operations, these types of systems are gaining immensely in popularity. While the NP-9030 was, when first introduced, a revolutionary product, it can no longer keep pace with advancements in the art, many of which are spurred on by advancements in related art areas, such as facsimile and computer.

Advancements in the area of digital design has had a profound effect on the design of electronic reprographic systems. Indeed, in 1990, Xerox launched an electronic reprographic system, known as Docutech, that should serve as a benchmark in the area of electronic reprographics for many years to come. In systems such as Docutech, documents being scanned by an automatic document scanner, also known as an image input terminal (IIT), are processed by an electronic sub-system (ESS) controller and stored in permanent memory pending printing, editing or later use. The ESS of the Docutech system represents a great advancement in the art; however, the highly advanced ESS of Docutech carries a relatively high price, in terms of design and manufacturing. Consequently, to those users who seek some of the advantages of electronic reprograpics, without the potentially inaccessible price tag of Docutech, there continues to be a demand for a system having a relatively high speed, yet inexpensive ESS.

A relatively inexpensive electronic reprographic machine is disclosed in RESEARCH DISCLOSURE, No. 32388, March, 1991. This machine comprises a scanner communicating with a memory section and a Video Processor (VP) by way of a CPU. In one form of operation image data can be transmitted to addresses configured in the memory by the CPU. Moreover, the image data can be retrieved from memory and processed with the VP.

The following patents, which relate to image data transfer in image processing devices, may be of pertinence to the present disclosure:

U.S. Pat. No. 4,580,171
Patentee: Arimoto
Issued: Apr. 1, 1986

U.S. Pat. No. 4,800,431
Patentee: Deering
Issued: Jan. 24, 1989

U.S. Pat. No. 4,920,427
Patentee: Hirata
Issued: Apr. 24, 1990

U.S. Pat. No. 4,931,984
Patentee: Ny
Issued: Jun. 5, 1990

U.S. Pat. No. 4,987,529
Patentee: Craft et al.
Issued: Jan. 22, 1991

U.S. Pat. No. 5,016,114
Patentee: Sakata et al.
Issued: May 14, 1991

U.S. Pat. No. 5,021,892
Patentee: Kita et al.
Issued: Jun. 4, 1991

U.S. Pat. No. 5,027,221
Patentee: Hisatake et al.
Issued: Jun. 25, 1991

U.S. Pat. No. 5,038,218
Patentee: Matsumoto
Issued: Aug. 6, 1991

U.S. Pat. No. 4,580,171 discloses an image a system in which a reader is coupled with a CPU and an image memory. The memory includes an address counter for sequentially designating addresses to which respective bytes of image data generated by the reader are transferred. As each address is designated by the counter, a memory control signal is transmitted from the CPU to the memory so that the byte can be transferred to or from the memory. An arrangement of a byte counter and a comparator is employed to determine when a preselected number of bytes has been transferred to or from the memory. The preselected number of bytes written into the memory are transferred to a pair of line buffers for subsequent output.

U.S. Pat. No. 4,800,431 discloses a video signal processing device frame buffer controller for storing a frame of an image in its original, intermediate or final form in a frame memory. The frame buffer controller comprises a video input interface, a video output interface, a microprocessor interface and a memory interface. Input data is in an eight bit format, and two successive eight bit chunks are stored in an input buffer so that a sixteen bit format can be transferred to memory through a memory controller. Similarly, in the output interface sixteen bits from the memory are held in a buffer and transmitted to the output eight at a time. This allows the input and output channels to alternate internally while appearing externally to be operating simultaneously. Apparently, data from a system controller, namely a microprocessor, is transferred to the memory controller by way of the input buffer. Hence, it follows that the system controller cannot access the memory controller while image data is being inputted to the input buffer.

U.S. Pat. No. 4,920,427 discloses a facsimile apparatus having multiple bus lines. A first pair of bus lines for carrying image data are coupled with a DMA, a RAM, a disk controller, a data compressor, a data decompressor and a CPU. The CPU is also connected to a third bus, the third bus being connected to a plurality of devices including a working memory (a RAM) for the CPU and a ROM for storing programs used in the CPU. An object of the invention is achieved by inhibiting at least a calling operation during an interval in which a call signal is interrupted so as to prevent "collision" of a receiving operation and the calling operation.

U.S. Pat. No. 4,931,984 discloses a file data retrieving system architecture including: a main bus having a CPU, a memory and a plurality of interfaces connected thereto; an image bus; a pair of data processing units for performing data compression and reproduction, each data processing unit being connected to both the main bus and the image bus; and two display memories, each display memory having data storage capacity corresponding to at least one page of a document of a maximum size, and each display memory being connected to both the main bus and the image bus. The above-described architecture makes it possible to reduce load on the main bus due to a toggle processing of data wherein image data is only transmitted on the image data bus.

U.S. Pat. No. 4,987,529 discloses a bus arbitration control system for a computer system having a microprocessor, a system memory, a memory refresh circuit, a DMA controller, and a plurality of peripheral device bus masters and a shared bus. The arbitration control system gives highest priority to a bus access request signal from the memory refresh circuit. The DMA controller is given second priority access to a shared bus, and the peripheral device bus masters are given next highest priority. The priority rankings of the peripheral device bus masters rotate each time a bus master is granted access to the bus. The microprocessor is given lowest bus access priority except when an interrupt signal must be serviced.

U.S. Pat. No. 5,016,114 discloses a digital copier apparatus with external laser card storage and image compression. In one embodiment of the invention a processor bus is coupled with a main bus and a local bus. An IIT/IOT module, an MPU, a main storage section and an I/O control block are coupled with the processor bus. Additionally, a bit map memory, a compander, a DMAC, a buffer memory and a laser card module are coupled with the main bus. Finally the bit map memory, the compander and the DMAC are also coupled with the local bus. In one example, the buffer memory can be omitted and the compander can be integrated with a FIFO buffer. When the compander and the FIFO are integrated, the buffer memory can be omitted and image data can be fed continuously to the laser card module.

U.S. Pat. No. 5,021,892 discloses an image processing device for controlling data transfer comprising an image scanner, an image printer, a facsimile control unit, a multi-purpose bus, a bidirectional parallel interface unit, and a main CPU. Data can be moved among various input/output units of the device by way of the main CPU. Moreover, the device includes a memory, the memory including a table of I/O codes. The I/O codes can be used to express predetermined combinations of the input/output devices between which data can be transferred.

U.S. Pat. No. 5,027,221 discloses a digital image recording system comprising an IIT, an IOT, a compressor/decompressor arrangement, a controller and a storage unit. The IIT and IOT are coupled with the controller by way of a first bus so that scanning and printing rates of the recording system can be controlled by the controller, while the compressor and decompressor are coupled with the controller by way of a second bus so that compression/decompression rates can be controlled by the controller. The storage unit communicates with the IIT and compressor for permitting temporary or long-term storage of image data generated at the IIT.

U.S. Pat. No. 5,038,218 discloses a digital copying apparatus comprising a video processor coupled with a plurality of input devices and a plurality of output devices. Each input device is selectively coupled with the video processor by way of an input selector while each output device is selectively coupled with the video processor by way of an output selector. The video processor comprises a main control circuit, the main control circuit communicating with the input and output selectors as well as a DMAC, a memory section, a plurality of image manipulation devices and a plurality of input/output devices.

The following patents relate generally to electronic reprographic systems, and may be of pertinence to the present discussion:

U.S. Pat. No. 4,169,275
Patentee: Gunning
Issued: Sep. 25, 1979
U.S. Pat. No. 4,205,350
Patentee: Gunning
Issued: May 27, 1980
U.S. Pat. No. 4,672,186
Patentee: Van Tyne
Issued: Jun. 9, 1987

U.S. Pat. Nos. 4,169,275 and 4,205,350 each disclose a reproduction scanning system having intermediate storage between input and output scanning stations wherein an input document is scanned in first and second directions, the first direction being orthogonal to the second direction, and the electrical signals being representative of information on the scanned document stored on an intermediate storage member. The information stored in the intermediate storage member may be read out and reproduced on a reproducing medium.

U.S. Pat. No. 4,672,186 discloses a document scanning system which scans printed documents for subsequent storage, retrieval and manipulation. A computer interlaces with a computer I/O bus and printer interface. The computer also controls the operation of a video terminal subsystem through a buffer interface and a synchronous data link control master. A high speed transport system is employed to transport individual documents through image capture stations, machine readers, encoders and sorters.

With the advent of electronic reprographic systems, the demand for multifunctionality will continue to increase. For example, U.S. Pat. No. 5,038,218, which is also discussed above, discloses a personal computer, facsimile apparatus and image read device coupled selectively to a single bus of a video processor by way of an input selector. U.S. Pat. No. 4,897,735 (Patentee: Oneda; Issued: Jan. 30, 1990) also discloses an electronic reprographic machine in which multiple input/output devices, such as a floppy disk device, a scanner and a printer are coupled with a single bus. In an arrangement such as that described in these two patents, data movement can be improved by, among other approaches, data interleaving or increasing bus size. Use of either approach can be undesirable. That is, when interleaving, data loss can occur if the amount of data becomes too great for the bus to manage. While more data can be managed by using a bus with relatively great width such buses can be expensive as well as noisy. U.S. Pat. No. 5,016,114, which is discussed above, discloses an arrangement in which a plurality of input/output devices are coupled with a plurality of buses. This arrangement, however, functions similarly to a single bus system since the buses, with their respective components, do not appear to operate independently of one another.

To achieve greater cost effectiveness, it has been proposed to use an architecture employing a main processor and a coprocessor. The following patents relate generally to the computer art, and more specifically to coprocessors adapted for respective use with main processors.

U.S. Pat. No. 4,833,596
Patentee: Buckland et al.
May 23, 1989
U.S. Pat. No. 4,920,481
Patentee: Binkley et al.
Issued: Apr. 24, 1990

U.S. Pat. No. 4,833,596 discloses a system and method for controlling the display of data in a data processing system. The system includes a main processor, a memory subsystem and an input/output subsystem. The input/output subsystem includes an I/O Channel Controller for managing traffic on an I/O bus having an attached coprocessor and a plurality of I/O devices including display devices with different reserved I/O address space. The system and method permit data that is being processed by the system's main processor and data being processed by the system's coprocessor to be displayed individually or in a shared manner selectively on the display devices.

U.S. Pat. No. 4,920,481 discloses a system having an architecture similar to that of the Xerox 6085. The system includes a main processor, a display/memory subsystem and an input/output processor (IOP) subsystem. The IOP subsystem includes a bus to which a plurality of input/output devices are coupled by way of respective controllers. One of the controllers is a rigid disk controller, which rigid disk controller is coupled to the bus via a DMA controller for facilitating data movement. The controllers are serviced by an IOP, the IOP having access to local memory sections. Additionally, a PC emulator is coupled to the bus and an arbiter is coupled with the IOP. Preferably, the arbiter is adapted to arbitrate requests from, among other sources, the DMA controller, the IOP and the PC emulator.

The system disclosed by U.S. Pat. No. 5,016,114 appears to lack flexibility since it only uses one processor to perform a wide variety of tasks. For example, the processor of the '114 patent must take time out to program the DMAC for each data transfer between the bit map memory and the buffer memory. During this time the MPU cannot process image data, so apparently video processing must be temporarily halted.

While the system of U.S. Pat. No. 4,920,481 affords a high level of flexibility, and is well suited for its intended purpose, it is not designed to store substantial quantities of data in the IOP subsystem while concurrently processing data in the main processor. In particular the local memory sections of the IOP subsystem are dedicated to the IOP and are not capable of storing any significant quantities of image. Accordingly when the main processor is busy, any I/O device seeking access to the memory subsystem must hold in a wait state. Such waiting can be inconvenient to a user seeking access to the IOP bus. Moreover, for a given input/output device on the IOP bus, the corresponding data transfer is limited in speed to the data transfer rate of the given input/output device.

It would desirable to provide a system in which the user could input data to a coprocessor substantially concurrent with data being processed in a video processor. Moreover it would desirable to provide the coprocessor with the capability to transfer the data to and receive the data from the video processor in an efficient and timely manner.

SUMMARY OF THE INVENTION

In accordance with the present invention, an improved printing machine for concurrently processing first and second sets of image data is provided. The printing machine preferably comprises a video processor, capable of processing the first set of image data, a system memory, adapted to store the second set of image data, and means for transmitting image data, addresses and control data thereacross. Both of the video processor and the system memory are coupled with the transmitting means. Additionally, means for transferring the second set of image data between the input/output device and the system memory substantially concurrent with the first set of image data being processed in the video processor is provided. The transferring means preferably transfers the second set of image data in response to receiving a signal from the input/output device.

In one aspect of the disclosed embodiment of the present invention a plurality of input/output devices, each of which can comprise a discrete intelligent module, are coupled with the transmitting means. Additionally, the system memory can be adapted to store at least 2 MB of image data.

In another aspect of the disclosed embodiment of the present invention the video processor includes a first microprocessor adapted to selectively control the movement of the first set of data within the video processor and the transferring means comprises a second microprocessor adapted to selectively control the movement of the second set of image data between the second microprocessor, the input/output device and the system memory. Additionally, in one preferred embodiment, the transferring means further comprises a direct memory access apparatus for performing data transfers between the input/output device and the system memory independently of the second microprocessor.

In yet another aspect of the disclosed embodiment of the present invention the printing machine further comprises means, coupled with each of the video processor, the second microprocessor and the direct memory access apparatus, for arbitrating which one of the video processor, the second microprocessor and the direct memory access apparatus is permitted to access the transmitting means when the arbitrating means receives request signals substantially concurrently from at least two of the video processor, the second microprocessor and the direct memory access apparatus. In one example, the arbitrating means is programmable to optimize arbitration time intervals and/or synchronized with the system memory to permit single-cycle data transfers.

In yet another aspect of the disclosed embodiment of the present invention the video processor comprises a multipurpose bus, the multipurpose bus being coupled with the transmitting means and adapted to transfer the first set of image data thereacross. Additionally, an input apparatus is coupled with the multipurpose bus for transmitting the first set of data, and a second system memory is coupled with the multipurpose bus for receiving the first set of image data from the input apparatus. Finally, the video processor comprises means, coupled with the input apparatus and the second system memory, for buffering the first set of image data as it is transmitted from the input apparatus to the second system memory. Preferably, the first system memory is in communication with the second system memory so that the second set of image data can be transferred between the first system memory and the second system memory substantially concurrent with the first set of image data from the input apparatus being buffered in the buffering means.

Numerous advantages of the present invention will be appreciated by those skilled in the art.

One advantage of the present invention is that it maximizes the efficiency of the video processor. In particular, the coprocessor buffers input/output cards having slow data transfer rates so that data from such devices can be transferred between the coprocessor and the video processor in a burst mode. Accordingly, the video processor need not waste time transmitting data to or receiving data from the input/output cards. Moreover a high level of concurrency is achieved between the video processor, the coprocessor and the input/output cards. Finally, when each of the video processor and the coprocessor respectively possess first and second processors, the video processor need not "babysit" the coprocessor each time the coprocessor seeks to process data independently of the video processor.

Another advantage of the present invention is that the coprocessor possesses an efficient design. When added to the video processor, the coprocessor enables a modular design extending the base features of the printing machine to meet a broad range of requirements in an easily configurable manner. For example, a broad range of input/output cards can be coupled in the coprocessor, and their operation is transparent to the video processor.

Yet another advantage of the present invention is that the coprocessor is multifunctional. In one example, the coprocessor has a processor that is able to perform internal tasks independently of data transfers within the coprocessor. In another another example, each Input/output card in the coprocessor comprises a discrete intelligent module so that each IOC is capable of doing much of its own "housekeeping." In yet another example, image manipulation can be performed in the coprocessor while data is being transferred between any given input/output card and the system memory of the coprocessor.

These and other aspects of the invention will become apparent from the following description, the description being used to illustrate a preferred embodiment of the invention when read in conjunction with the accompanying drawings.

DESCRIPTION OF A PREFERRED EMBODIMENT OF THE INVENTION

Figure 1:
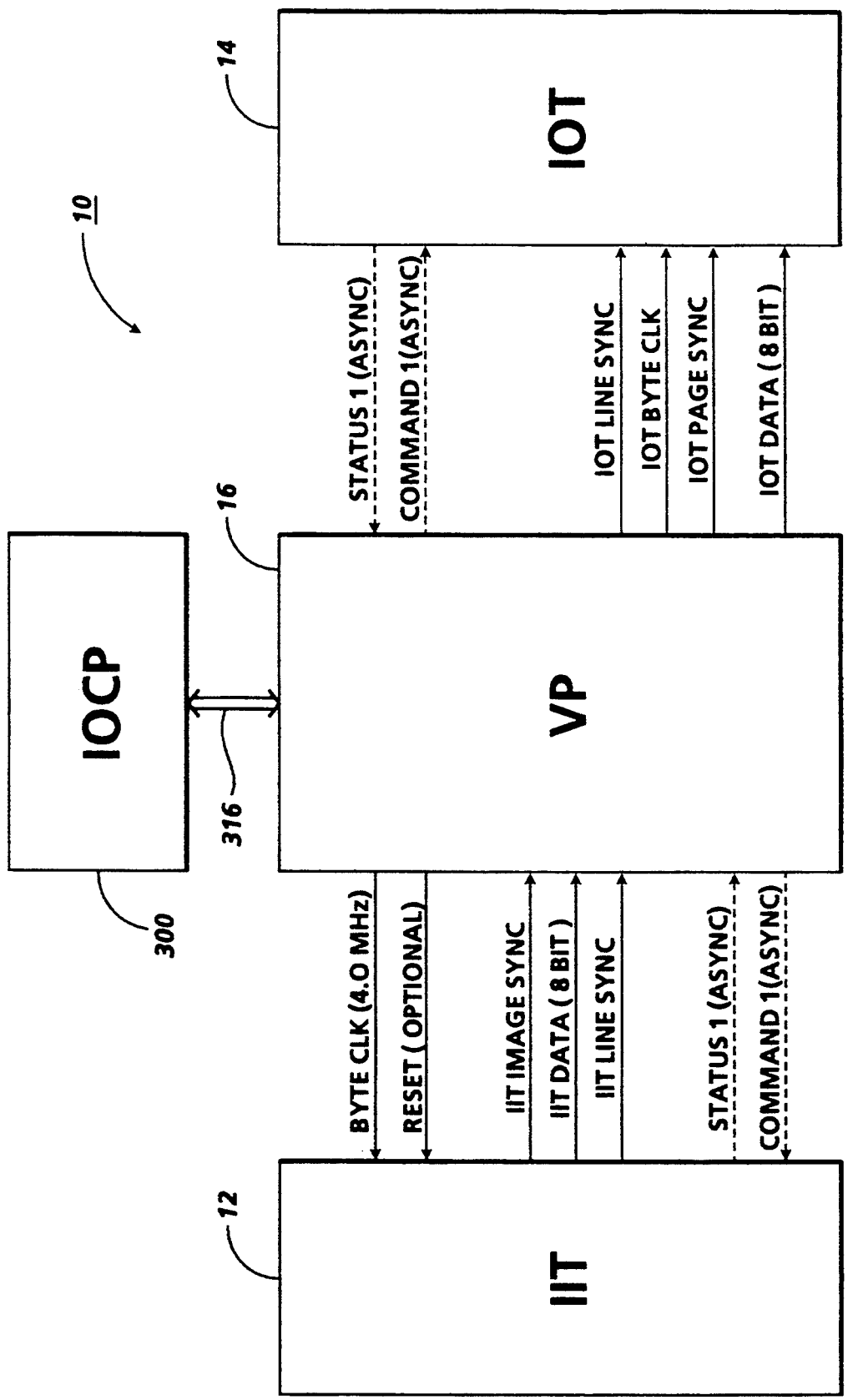
FIG. 1 is a schematic, block diagramatic representation of a printing machine including a video processor and a coprocessor.
Figure 2:
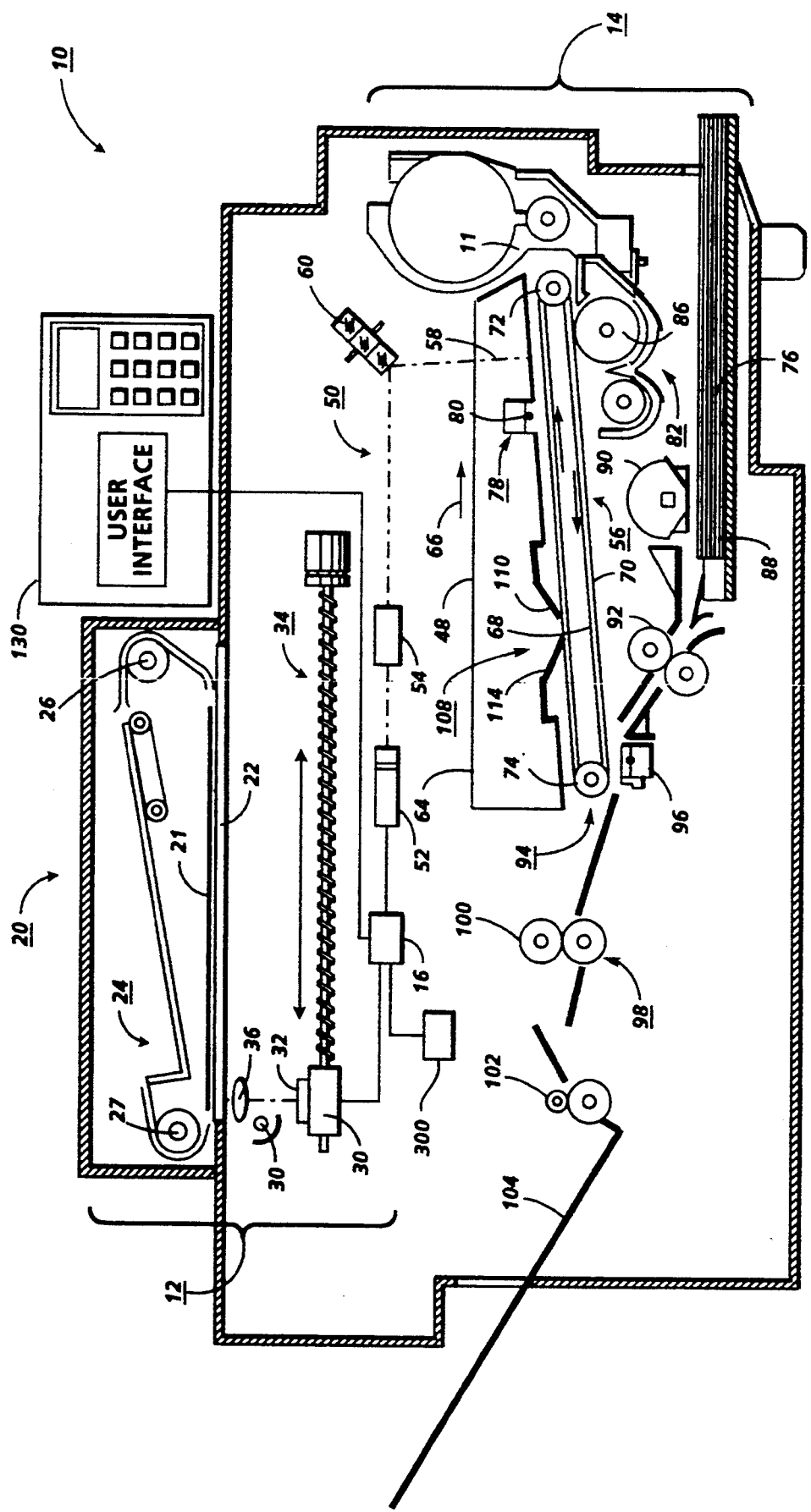
FIG. 2 is sectional partially schematic view of the printing machine.

Referring to the drawings, in which like reference numerals designate identical or corresponding parts throughout the several views, and more particularly to FIGS. 1 and 2, there is shown an exemplary printing apparatus 10 for processing image data in accordance with the teachings of the present invention. Generally, the printing apparatus 10 comprises an image input terminal (IIT) 12, image output terminal (IOT) 14, a video processor (VP) 16 and an input/output coprocessor (IOCP) 300. Referring to FIG. 2, the IIT 12, the IOT 14 and the VP 16 are shown in a digital copying apparatus. As will be appreciated by those skilled in the art, the concepts underlying the printing apparatus 10 are applicable to many types of machines employing a scanning device coupled with a printing or output device.

For inputting image data, the IIT 12 (FIG. 2) includes a scanning section having an automatic document handler (ADH) 20 for automatically and sequentially placing one or more documents 21 on a transparent platen 22. In one example, the document 21 to be scanned is brought from a document tray 24 forward by the document handlers 26,27 into position on the platen 22 for scanning. Following scanning, the document 21 is returned to the document tray 24. While a particular document handler is shown, one skilled in the art will appreciate that other document handler types may be used instead or the documents 21 may be placed manually on the platen 22.

In the preferred embodiment, the scanning section of the IIT 12 employs one or more linear scanning arrays 30, which arrays 30 may comprise charge couple devices (CCDs) supported below and in scanning relation to the platen by a carriage 32. To scan a document placed on the platen 22, the carriage 32 can be reciprocated by reciprocating means 34, the reciprocating means 34 being similar to the reciprocating arrangement disclosed in U.S. Pat. No. 4,387,636 to Daniele et al., the pertinent portions of which patent are incorporated herein by reference. A suitable lens 36 is provided to focus arrays 30 on a line-like segment of the platen 22 and the documents resting thereon. A suitable lamp 38 illuminates the document line being scanned.

Figure 3A:
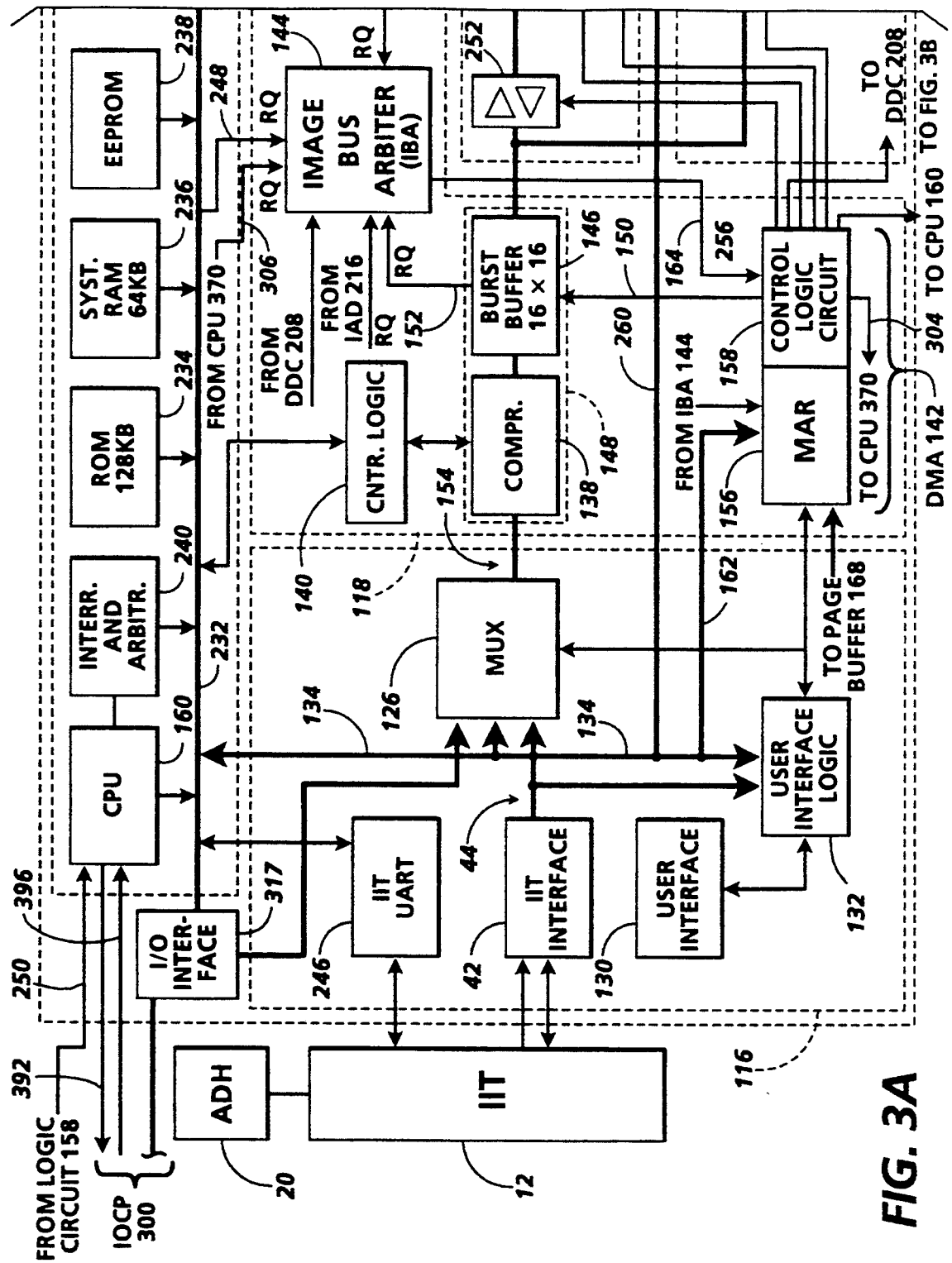
FIGS. 3A and 3B, viewed together, are a schematic, block diagramatic representation of the printing machine.
Figure 4:
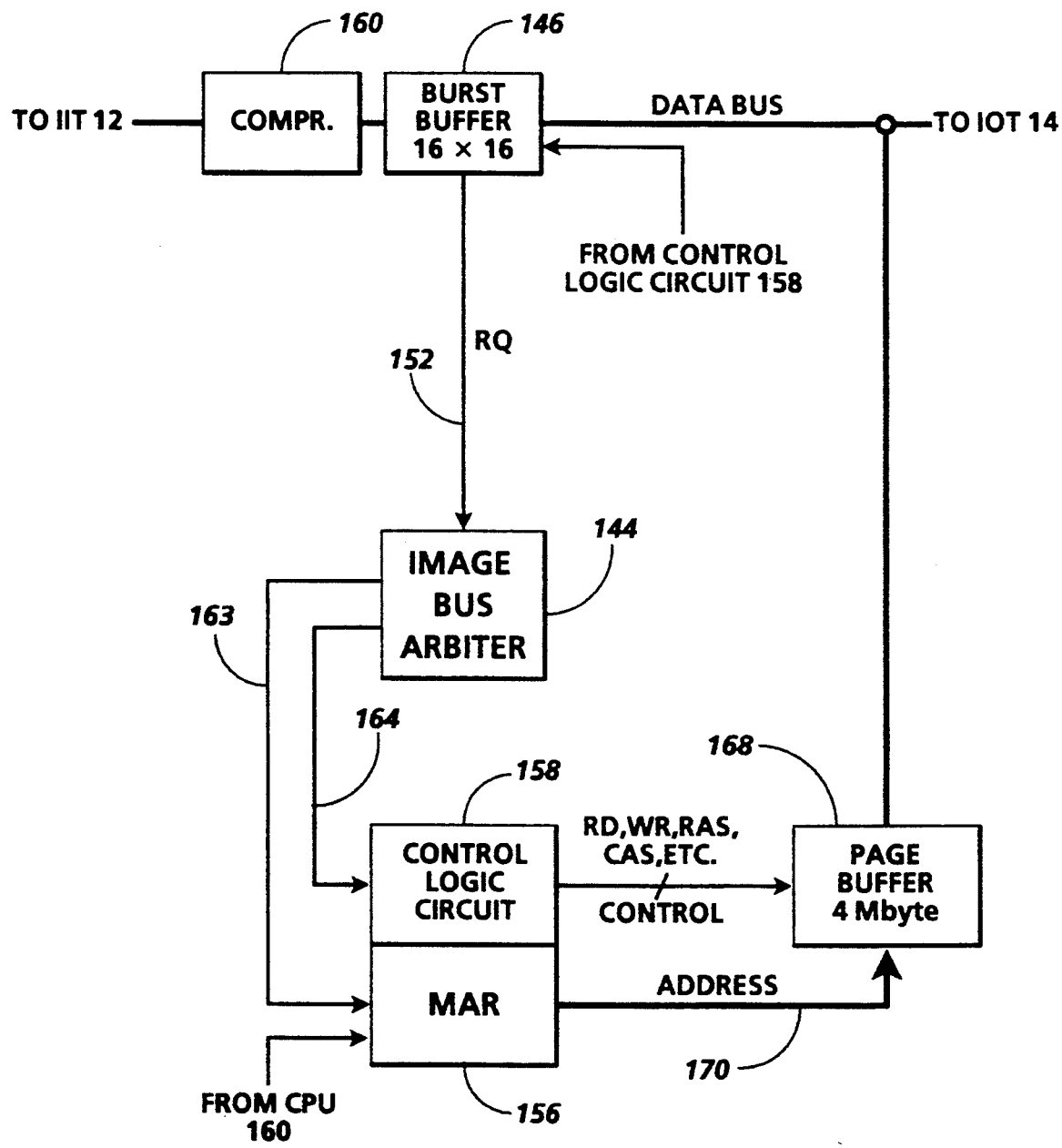
FIG. 4 is a partial view of the representation of FIGS. 3A and B.

Referring to FIGS. 3A and 4, arrays 30 provide electrical image data or pixels representative of the document image scanned which are inputted to the VP 16 across a suitable IIT interface 42. As will be understood, the image data may be used for purposes other than printing copies, as for example, the image data may be transmitted via a communication channel (not shown) to another location, or stored, etc. In the preferred embodiment, the interface 42 includes differential transmitters/receivers and appropriate control logic adapted to provide data/control flow between the IIT 12 and the VP 16. In the preferred embodiment, interface 42 provides for an 8 bit wide image data bus 44 having a constant transfer rate of 4 Mbytes/sec.

Image data is transmitted from the VP 16—the structure and operation of which VP 16 is explained in further detail below—to the IOT 14 by way of an IOT interface 46. Additionally, the VP 16 is coupled with a input/output coprocessor (IOCP) 300, the structure and operation of which IOCP 300 is discussed in further detail below. Referring again to FIG. 1, the IOT 46 provides image data and control signal paths between the IOT 14 and the VP 16 as well as includes two two scan line deep ping-pong buffers (not shown), the ping-pong buffers preferably being two 2K×8 SRAMs. In the preferred form of operation, the image data is clocked out of the IOT interlace 46 by way of a byte clock (not shown).

Referring specifically to FIG. 2, the structure and operation of the IOT 14 is explained in further detail. The IOT 14 includes a raster output scanner (ROS) 50 having a suitable source of high intensity light, such as laser 52, modulated in accordance with the content of the image data as by an acousto-optic modulator 54 to provide zero and first order imaging beams. The imaging beam is scanned across a photoreceptor 56 at an exposing station 58 by a scanning polygon 60 to expose the previously charged photoreceptor 56 and create a latent electrostatic image or the document represented by the image signals to modulator 54. Suitable means (not shown) are employed to focus the beam on the photoreceptor 56.

The printing apparatus 10 illustrated in FIG. 2 employs a removable processing cartridge 64 which may be inserted and withdrawn from the main machine frame in the direction of arrow 66. Cartridge 64 includes the photoreceptor 56, which in one example comprises a belt like member 68, the outer periphery of the belt like member 68 being coated with a suitable photoconductive material 70. The belt 68 is suitably mounted for revolution within the cartridge 64 about driven transport roll 72, around idler roll 74 and travels in the direction indicated by the arrows on the inner run of the belt to bring the image bearing surface thereon past the plurality of xerographic processing stations. Suitable drive means such as a motor, not shown, are provided to power and coordinate the motion of the various cooperating machine components whereby a faithful reproduction of the original input scene information is recorded upon a sheet of final support material 76, such as paper or the like.

Initially, the belt 68 moves the photoconductive surface 70 through a charging station 78 wherein the belt 68 is uniformly charged with an electrostatic charge placed on the photoconductive surface 70 by charge corotron 80 in known manner preparatory to imaging. Thereafter, the belt 68 is driven to the exposure station 58 wherein the charged photoconductive surface 70 is exposed to line-by-line scanning of the ROS 50, whereby the charge is selectively dissipated in the light exposed regions to record the original input image in the form of electrostatic latent image. The speed of the scanning carriage 32 and the speed of the belt 68 are synchronized to provide faithful reproduction of the original document.

After exposure of belt 68 the electrostatic latent image recorded on the photoconductive surface 70 is transported to development station 82, wherein developer is applied to the photoconductive surface 70 of the belt 68 rendering the latent image visible. The development station 82 includes a magnetic brush development system including developer roll 86 utilizing a magnetizable developer mix having course magnetic carrier granules and toner colorant particles.

Sheets 76 of the final support material are supported in a stack arranged on elevated stack support tray 88. With the stack at its elevated position, the sheet separator segmented feed roll 90 feeds individual sheets therefrom to the registration pinch roll pair 92. The sheet 76 is then forwarded to a transfer station 94 in proper registration with the image on the belt and the developed image on the photoconductive surface 70 is brought into contact with the sheet 76 of final support material within the transfer station 94 and the toner image is transferred from the photoconductive surface 70 to the contacting side of the final support sheet 76 by means of transfer corotron 96. Following transfer of the image, the final support material 76 is separated from the belt 68 by the beam strength of the support material 76 as it passes around the idler roll 74, and the sheet 76 containing the toner image thereon is advanced to fixing station 98 wherein roll fuser 100 fixes the transferred powder image thereto. After fusing the toner image to the sheet 76, it is advanced by output rolls 102 to sheet stacking tray 104.

Although a preponderance of toner powder is transferred to the final support material 76, invariably some residual toner remains on the photoconductive surface 70 after the transfer of the toner powder image to the final support material. The residual toner particles remaining on the photoconductive surface after the transfer operation are removed from the belt 70 by a cleaning station 108, which cleaning station 108 comprises a cleaning blade 110 in scrapping contact with the outer periphery of the belt 68 and contained within a cleaning housing 112, the cleaning housing 112 having a cleaning seal 114 associated with the upstream opening of the cleaning housing 112. Alternatively, the toner particles may be mechanically cleaned from the photoconductive surface by a cleaning brush as is well known in the art.

Figure 3B:
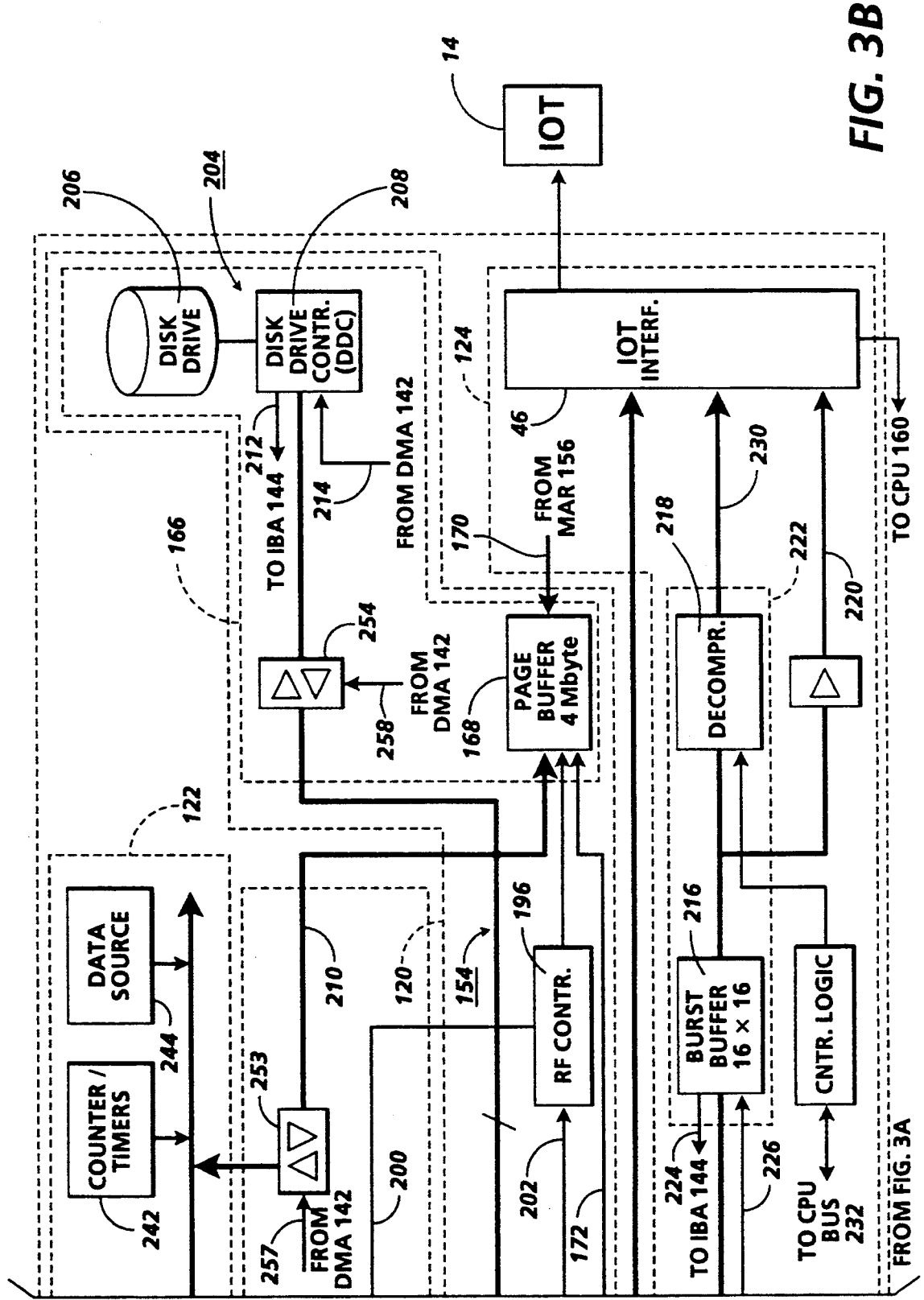

Referring to FIGS. 3A and 3B, the structure of the VP 16 is explained in further detail. The VP 16 comprises an input network 116, a first memory interface network 118, a memory network 120, a computer network 122 and a second memory interface network 124. The input network 116 comprises a multiplexor (MUX) 126 as well as a user interface (UI) 130 coupled with suitable UI logic circuitry 132. A 16-bit bus 134 allows the MUX 126 and the UI logic circuitry 132 to communicate with the computer network 122. Additionally, the 8-bit image data bus 44 communicates with the MUX 126 and the UI logic circuitry 132. In one example, the UI 130 includes conventional control circuitry coupled with a CRT, the control circuitry being adapted to initiate operation of the printing apparatus 10 in a known manner.

The first memory interface network 118, which network 118 (FIG. 3) includes a compressor 138 coupled with the computer network 122 by suitable control logic circuit 140, a direct memory access (DMA) circuit 142, an image bus arbiter 144 and a burst buffer 146. In the preferred embodiment, the compressor 138 comprises conventional components of the type suitable for use with the adaptive algorithm disclosed in U.S. Pat. No. 4,559,563 (to Joiner, Jr.)("'563 patent"), the pertinent portions of which are incorporated herein by reference. Additionally, the control logic 140 can comprise a known I/O device, such as the 8255 I/O port manufactured by Intel, Corp. One purpose of the compressor 138 is to maximize the rate at which data can be transmitted to the memory network 120. In the preferred form of operation, compression ratios of up to 30:1 have been achieved.

In the preferred embodiment, the compressor 138 is coupled with the burst buffer 146 as an integrated adaptive compressor (IAC), the IAC being designated by the numeral 148. While the illustrated burst buffer 146 of FIG. 3 is a "first in/first out (FIFO)" type buffer having a capacity of 64 Bytes, in other contemplated embodiments ping-pong buffers, such as the ones used in the IOT interface 46, could be substituted for the FIFO burst buffer 146. As is conventional, 8 bit bytes inputted to the IAC 148 by way of bus 44 can be combined into 16 bit bytes for transmission to the memory section 120. The IAC 148 is interconnected with the DMA circuit 142 by a control line 150, and with the IBA 144 by way of a request line 152.

Image data, in the form of 16-bit bytes are transmitted through the memory network 120 by way of a 16 bit bi-directional image bus 154. . Transmission of the image data from the IAC 148 is accomplished by use of the DMA circuit 142. Referring to FIG. 4, the DMA circuit 142 includes a memory access register (MAR) 156 and a control logic circuit 158, the control logic circuit 158 being adapted to transfer image data to and from I/O components, such as the IAC 148. As will be explained in further detail below, programming of the MAR 156 is achieved by use of the computer network 122, and more specifically with a CPU or MPU 160. In the illustrated embodiment of FIG. 4, the MAR 156 is packaged with control logic circuit 158, and the the MAR 156 (FIGS. 3 and 5) is coupled with the CPU 160 by way of a data bus 162 (PD00–PD15). Additionally, the MAR 156 and the control logic circuit 158 are coupled with the image bus arbiter 144 by way of respective control lines 163, 164.

Referring still to FIGS. 3 and 4, the memory network 120 includes a memory section 166 having a page buffer 168, the page buffer 168 being interconnected with the MAR 156 by a 24-bit address bus 170, and with the control logic circuit 158 by a control line 172. As will be explained in further detail below, read, write and other appropriate page buffer control signals can be transmitted across the control line 172 in response to commands transmitted by the IBA 144 to the control logic circuit 158.

Figure 5:
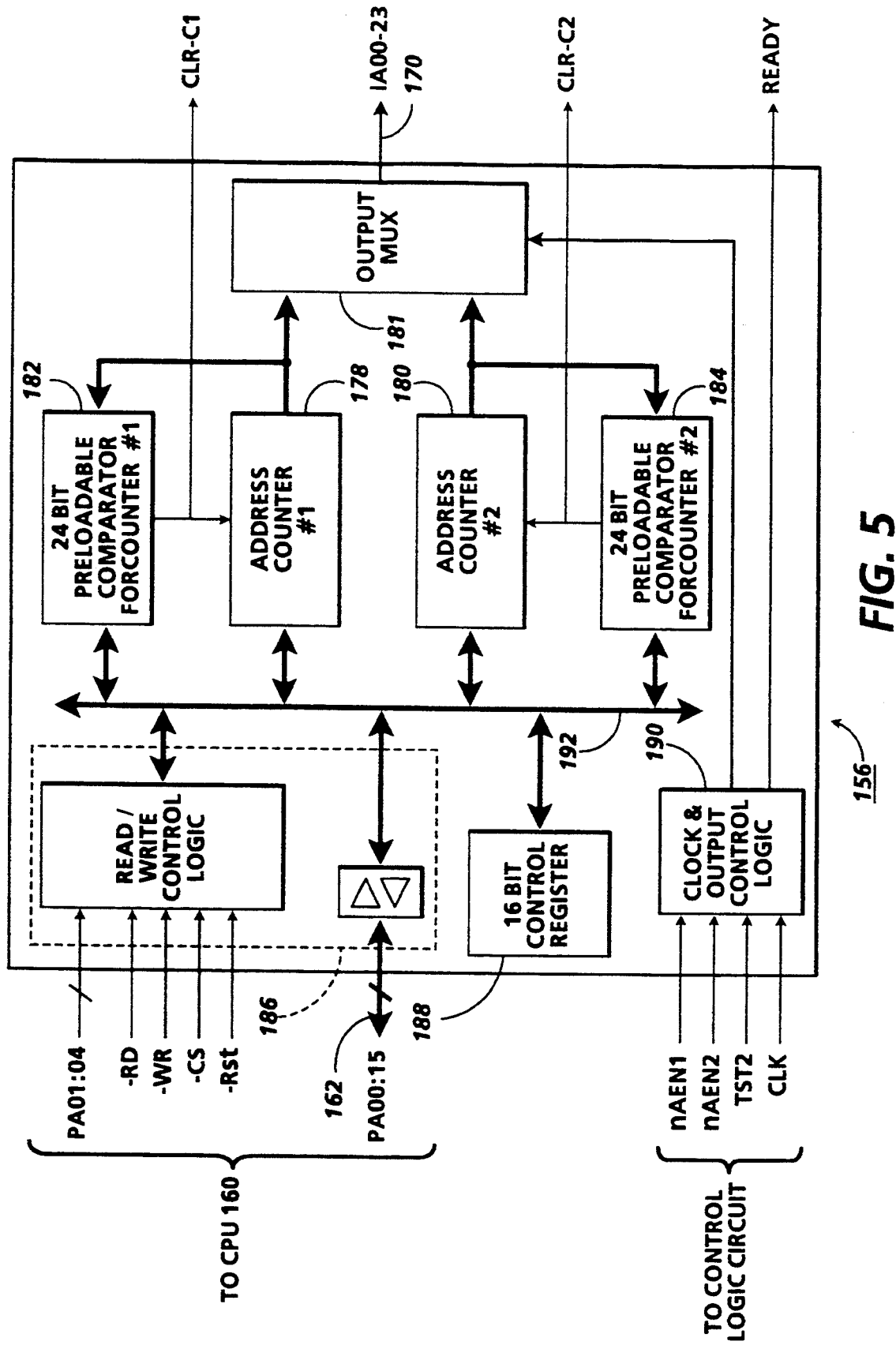
FIG. 5 is a schematic, block diagramatic representation of a memory access register (MAR) shown in FIGS. 3A and 4.

Referring specifically to FIG. 5, the structure of the MAR 156 is described in further detail, The illustrated MAR 156 includes a first address counter 178 and a second address counter 180, both of which counters 178,180 are selectively coupled with the address bus 170 by way of a 2:1 MUX 181, the MUX 181 having a tristated output. Additionally, a first 24-bit preloadable comparator 182 and a second 24-bit preloadable comparator 184 are respectively coupled with the address counters 178, 180. Each of the comparators 182,184 is adapted to set the beginning and finishing addresses of the address counter to which it is coupled.

In the preferred embodiment, each of the counters 178, 180 and the comparators 182,184 is coupled with an MPU interface 186, a control register 188, as well as a clock output and control logic circuit 190, by way of a suitable bus 192. As shown in FIG. 5, the MPU interface 186 preferably comprises various control lines which permit control of the MAR 156 by the CPU 160. For example, the four address lines PA1–PA4 can be used to set each internal register of the MAR 156, while the 16-bit bi-directional data bus lines of bus 162 can be used to provide control data for the control register 188. Moreover, the control register 188 is divided into two sections, with one section being dedicated to the first counter 178, and the other section being dedicated to the second counter 180. Finally, the clock output and control logic circuit 190, which can provide a clock rate of up to 32 MHz, is adapted to select which of counters 178,180 is to be placed on the address bus 170 to count from one address to another.

Referring again to FIGS. 3A and 3B, to provide cost saving, dynamic random access memory (DRAM) can be used to comprise the page buffer 168. Preferably the page buffer 168 has 4 Mbytes of DRAM. As will be appreciated by those skilled in the art, DRAM is a relatively inexpensive alternative to static RAM. When using DRAM, periodic refreshment is generally required by, for example, a conventional refresh control device ("RF controller") 196, which device 196 can be coupled with the page buffer 168 by way of the image data bus 154. The RF controller 196 communicates with the IBA 144 via request line 200, and with the control logic circuit 158 via a control line 202.

In those embodiments in which large quantities of data are to be stored in the memory section 166, a disk drive module 204 is disposed on the image data bus 154. The disk drive module 204 includes a disk drive 206, such as a "Winchester"-type hard disk drive with 50 Mbyte capacity, coupled with a disk drive controller ("DDC") 208. Further information regarding the structure and operation of the disk drive controller 208 is discussed in [Disk Drive Controller Application]. In the preferred embodiment, the module 204 communicates with the page buffer 168 via the image data bus 154, as well as with the computer network 122 via the image bus 154 and an intermediate bus 210. Additionally, the disk drive controller 208 is coupled with the IBA 144 by way of request line 212, and with control logic circuit 158 by way of control line 214.

The second memory interface network 124 comprises a burst buffer 216, a decompressor 218 and an 8-bit raw data bypass bus 220. In the preferred embodiment the burst buffer 216 is structurally equivalent to the burst buffer 146, and the decompressor 218 is part of the same IC package as the compressor 138. As with IAC 148, the burst buffer 216 is preferably coupled with the decompressor 218 to form an integrated adaptive decompressor (IAD) 222. The IAD 222 is coupled with the IBA 144 by way of request line 224, and with control logic circuit 158 by way of control line 226. The output of the burst buffer 216 is preferably 8-bit and the decompressor 218 is on an 8-bit data bus 230. The output of the decompressor 184 can be transmitted to the IOT interface 46 for printing, in a known manner, at the ROS 50.

The computer network 122 includes the CPU 160 coupled with a 16-bit CPU bus 232. In the preferred embodiment, the CPU 160 comprises a Motorola 68020 microprocessor capable of operating at a clock frequency of 10 MHz. Additionally the CPU bus 232 preferably comprises a 16-bit wide data bus, 23-bit wide address bus and control lines. Various types of memory, namely a ROM device 234, a system RAM device 236 and an EEPROM device 238, are respectively coupled with the CPU bus 232 to support the CPU 160 in a known manner. A local interrupt and arbitration device 240 as well as a counter(s)/timers section 242 are coupled to the CPU bus 232 to facilitate management and operation of the CPU bus 232 in a known manner.

It should be appreciated that an input device or data source 244, such as a workstation or another scanner can be coupled to the the CPU bus 232 so that data can be inputted to the memory section 166 concurrent with other I/O operations, such as accumulating image data in the burst buffer 146. Those skilled in the art will recognize that when certain input devices 244 are coupled to the CPU bus 232, such as a workstation, a suitable interface is preferably employed to achieve suitable coupling. Referring still to FIGS. 3A and 3B, the CPU 160 can be interconnected with the IIT 12, by an IIT universal asynchronous receiving/transmitting (UART) device 246. For the illustrated embodiment of FIG. 3, the CPU 160, as well as any device coupled to the bus 232, can use the CPU bus 232 and a request line 248 to seek access of the image data bus 154 through the IBA 144. The CPU 160 is coupled to the control logic circuit 158 by way of a control line 250.

It should be appreciated that the CPU 160 represents the "brains" of the VP 16. First, the CPU 160 serves as an operating system for the VP 16 in that it is responsible for, among other things, system initialization, "housekeeping," system management and communication with I/O devices. In particular, the CPU 160 serves as a diagnostic tool for VP 16-transmitting diagnostic signals through the MUX 126 and receiving feedback signals across the buses 210, 232. Second, as explained in further detail below, the CPU 160 plays a major role in facilitating data transfer by way of its communication with the DMA 142 across data bus 162. Third, the CPU 160 is capable of transferring data with the UI 130 and-/or the page buffer 168 for manipulating image data. For instance, the CPU 160 has registers in which various known digital operations, such as resolution conversion and data rotation, can be performed on the image data. Finally, since the CPU 160 is in direct communication with the page buffer 168, by way of bus 210, the CPU 160 can transfer data with the page buffer 168 independent of the IAC 148. Consequently, data can be transferred directly between the page buffer 168 and the CPU 160 while image data is being accumulated in the burst buffer 146.

To optimize the bandwidth capability of the image data bus 154, data can be selectively transmitted to and from the page buffer 168 with the aid of transceivers 252-254. In one example, the transceivers 252-254 are coupled to the control logic circuit 158 by way of respective control lines 256-258 so that the direction of each of transceivers 252-254, and accordingly the direction of data flow on the data bus 154, can be alternated programmably. Preferably, each of the transceivers comprises a 74F245 bi-directional transceiver manufactured by Texas Instruments, Inc.

As mentioned above, the image data transmitted to IOT interface 46 from page buffer 168 can be printed, in a known manner, at IOT 14. Storing one or more pages of image data before printing, however, can cause some delay in printing. To eliminate such delay, the VP 16 is provided with a "direct data bus" 260, the bus 260 coupling the IIT interface 42 directly with the IOT interface 46. Accordingly, when the input rate of the IIT 12 is synchronized relative to the output rate of the IOT 14, line-by-line synchronous input/output operations can be achieved.

In a preferred embodiment of the present invention the VP 16 is employed with an input/output coprocessor (IOCP), the IOCP being designated by the numeral 300 (FIG. 131 and discussed in further detail below. In one example, the IOCP 300 communicates with the VP 16 by way of an I/O bus 316, the I/O bus 316 being selectively coupled with the buses 154,232 (FIG. 3A) by way of an I/O interface 317. Additionally, the IOCP 300 includes a CPU section 302 which, among other things, permits the IOCP 300 to selectively communicate with the VP 16 for seeking access to the bus 154. In particular, the CPU section 302 is interconnected with the control logic circuit 158 by a control line 304, and with the IBA 144 by way of a request line 306.

Figure 6:
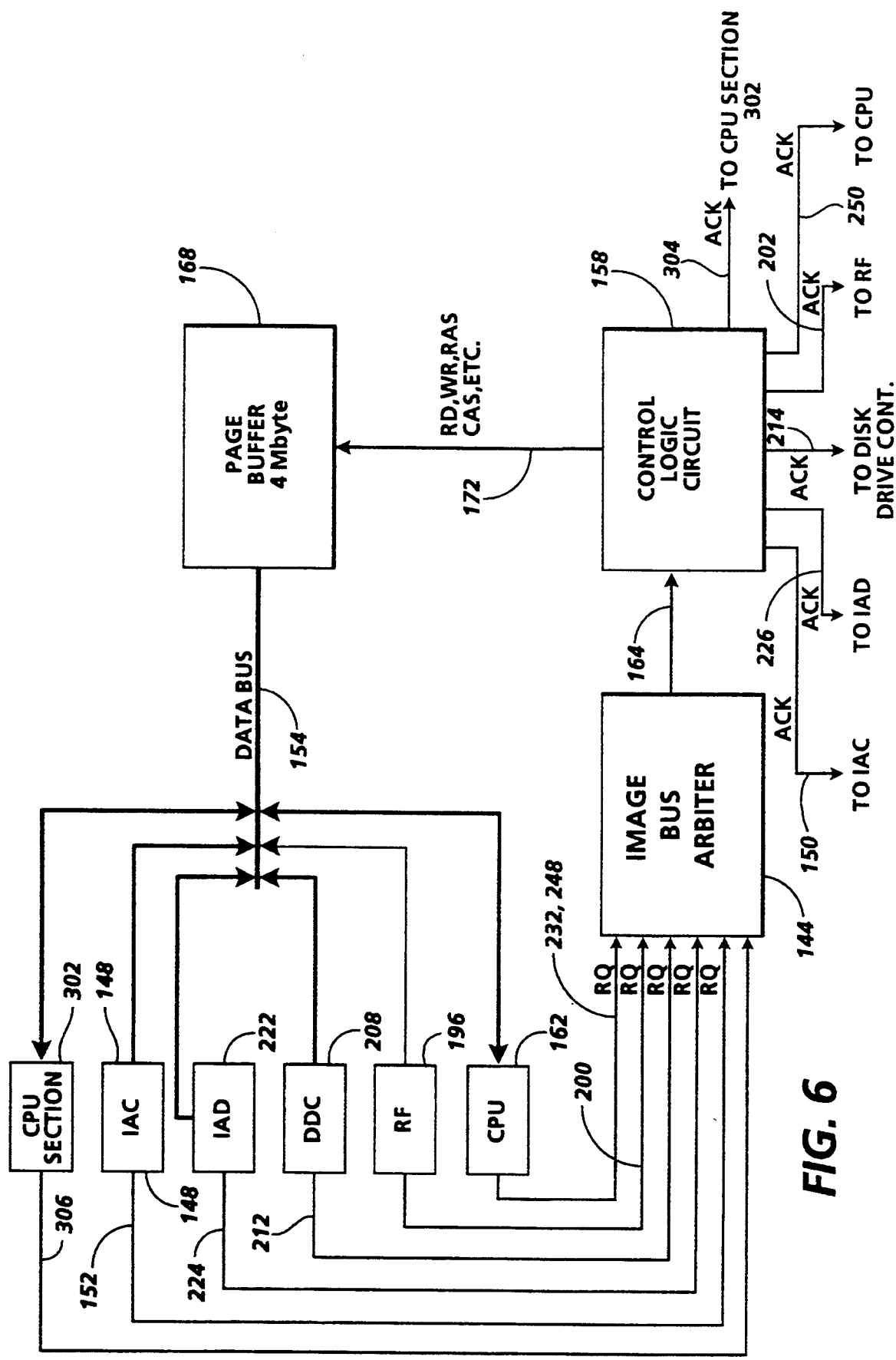
FIG. 6 is a partial view of the representation of FIGS. 3A–3B and 13.

Now that all of the structure of the VP 16 has been introduced, and the appropriate structure of the IOCP 300 has been mentioned, the sequencing role of the IBA 144 can be more fully understood. In the preferred embodiment the IBA 144 is implemented by way of a state machine, namely a Field Programmable Array, such as the PAL 82S105 manufactured by Signetics, Corporation. Referring to FIG. 6, the relationship of the IBA 144 to varios I/O components as well as to the control logic 158 and the page buffer 168, is shown. To seek access to the image data bus 154, and accordingly the page buffer (PB) 168, one or more of the IAC 148, the CPU 160, the RF controller 196, the disk drive controller (DDC) 208, the IAD 222 and the IOCP 300 transmit request signals across respective request lines 152, 248, 200, 212 and 224 and 306 to the IBA 144.

In response to software adapted for use with the 82S105 Array, the IBA 144 designates the order in which the above-mentioned components can access the bus 154. More specifically, the IBA 144 causes the control logic circuit 158 to transmit an appropriate control signal across one of control lines 150, 202, 214, 226 and 250 and 304 for selectively permitting one of the above-mentioned components to access the bus 154. As the control logic circuit 158 transmits the appropriate control signal to the designated one of the above-mentioned I/O components, it also transmits information to the page buffer 168, by way of control line 172, regarding which component has been permitted access to the bus 154. It will be appreciated by those in the art that while the sequencing arrangement has been shown with six components, in other contemplated embodiments additional components could be sequenced and controlled by the arrangement of the IBA 144 and the control logic circuit 158 without altering the concept disclosed by the present description.

Figure 7:
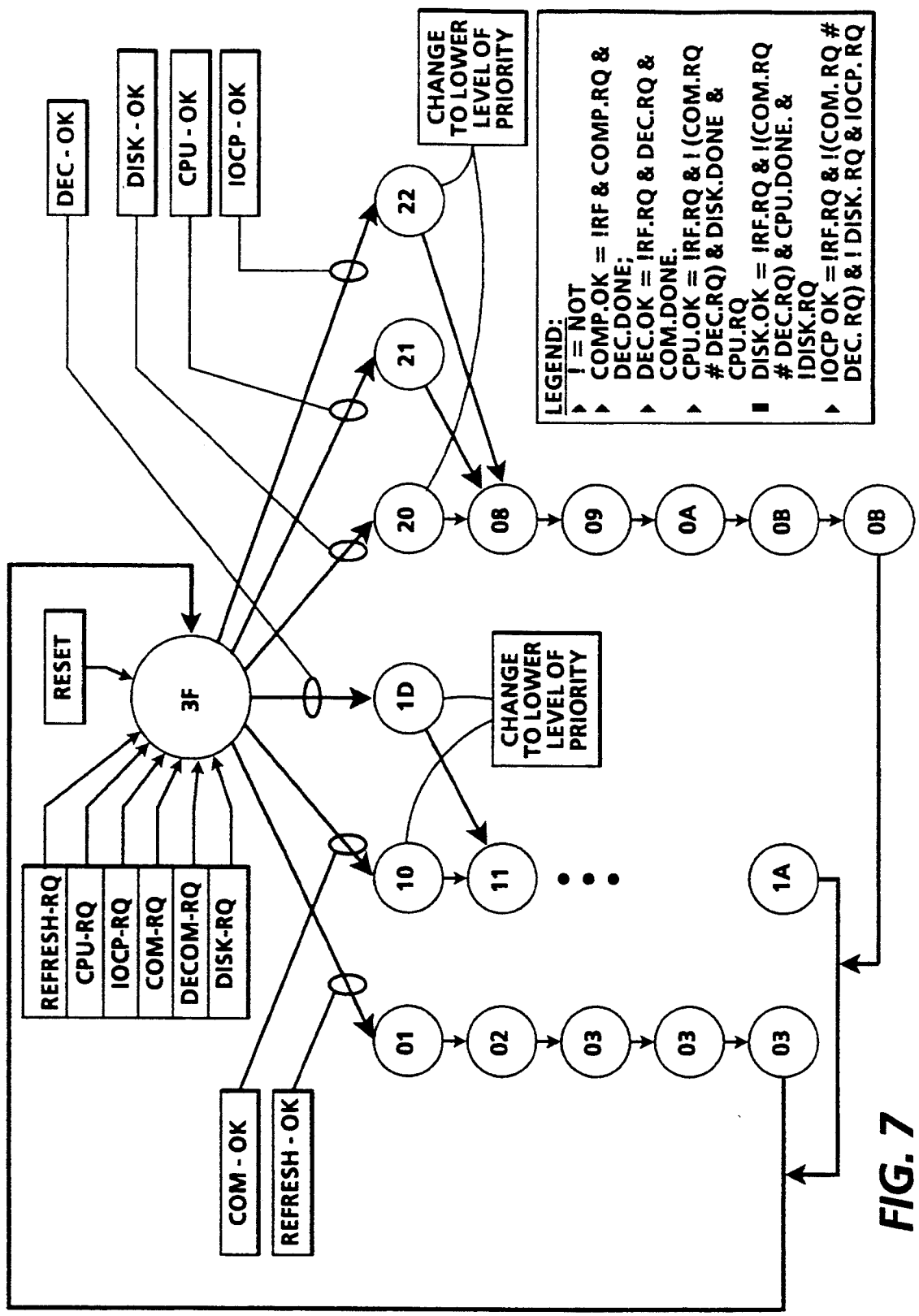
FIG. 7 is a state diagram of an image bus arbiter shown in FIGS. 3A, 4 and 6.

Referring to FIG. 7, the concept underlying the software employed to implement the IBA 144 is discussed in further detail. As will be recognized by those familiar with state diagrams, the numbered "bubbles" represent states through which a state machine can pass. Programming of the PAL 82S105 to accomplish the software of FIG. 7 is known to those skilled in the art. For the example of FIG. 7, in which arbitration is achieved for just six inputs, the PAL of the IBA 144 is driven by a 25 MHz clock and all input signals are synchronized with the clock so that the arbitration time is less than 40 ns. In this example, the priorities of the devices coupled to the IBA 144 are assigned as follows:

| | |
|---|---|
| RF 196 | #1 |
| IAC 148IAD 222 | #2/#3 |
| IAD 222 | #2/#3 |
| DDC 208 | #4/#5/#6 |
| CPU 160 | #4/#5/#6 |
| IOCP 300 | #4/#5/#6 |

As should be recognized, the priority of the RF 196 is fixed, while the priorities of the IAC 148, the IAD 222, the DDC 208, the CPU 160 and the IOCP 300 are rotated after each data transfer. As will be appreciated from the following discussion, the concept underlying the arbitration process is not affected by the order of priority in which the above-mentioned devices are set. Referring to FIG. 7, the sequencing and rotating capacity of the IBA 144 is explained in further detail. When a request is received at state 3F from one of the five devices, the state machine determines whether a higher priority request is being serviced. For instance, if the IAC 148 or IAD 222 seeks access to the bus 154, the machine checks to see if states 01–03 for the RF 196 are being executed. Assuming that the RF 196 is being serviced, the machine waits until the service routine for the RF 196 to be completed before proceeding to step 10 or 1D. Similarly, if the DDC 208, the CPU 160 or the IOCP 300 requests access to the bus 154, the machine determines whether the RF 196, the IAC 148 or the IAD 222 is being serviced before proceeding. The sequencing scheme of the arbitration example is elaborated on more completely in the Legend of FIG. 7.

Referring still to FIG. 7, the rotation of the IAC 148 and IAD 222 as well as the rotation of the DDC 208, the CPU 160 and IOCP 300 is achieved by the setting of a "flag." In one example, a request arrives for the IAC 148, the machine proceeds from states 3F to 10 and sets a flag so that the priority of the IAC 148 is set below the priority of the IAD 222. Accordingly, after the process returns to state 3F, if requests are received from IAC 148 and IAD 196 within about the same preselected time interval, the process continues through states 1D ∝ 1A rather than 10–1A. Upon proceeding to state 1D, another flag is set so that the priorities of the IAC 148 and IAD 196 are again rotated. Bearing in mind the above example, it will be recognized that the same flag setting approach can be used in servicing the DDC 208, the CPU 160 and the IOCP 300.

Figure 8:
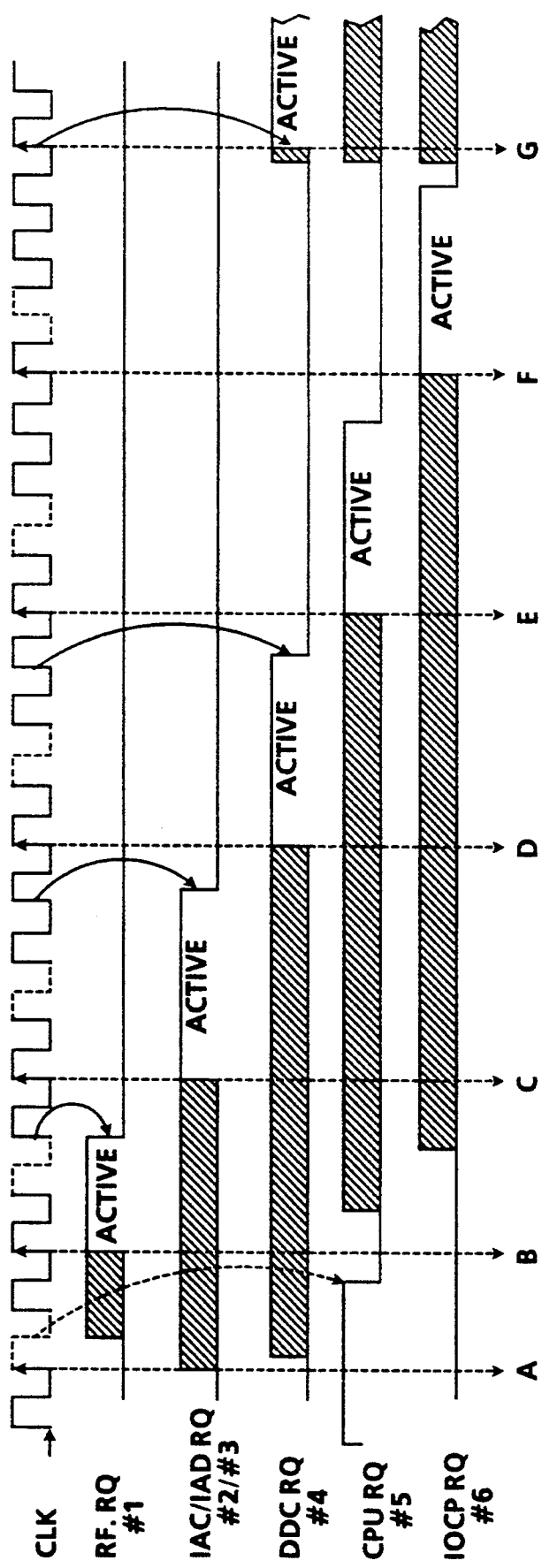
FIG. 8 is a timing diagram demonstrating an exemplary case of operation of the image bus arbiter.

Referring to the timing diagram of FIG. 8, another example of the rotation approach is discussed with greater specificity. The exemplary process begins with the CPU 160 transferring data to the page buffer 168 (active). In the time interval between A and B, the RF 196, the IAC 148, the IAD 22 and the DDC 208 request access to the bus 154. The IBA 144 waits until the CPU 160 transfer is completed and then grants the bus 154 (at time B) to the device having the highest priority, i.e. the RF 196. The IAD 148 or the IAD 222 and the DDC 208 wait until RF 196 has completed its transfer. After the DDC 208 has accessed the bus 154 (between times D and E), its priority is changed to less than #4 and at time E the CPU 160 accesses the bus 154. After the CPU 160 has made its second transfer (between times E and F), its priority is changed to less than #4 and the IOCP 300 accesses the bus 154 at time F. After the IOCP 300 has accessed the bus 154 (between times F and G), its priority is changed to #6 and the priorities of the DDC 208 and the CPU 160 are shifted back to #4 and #5, respectively. Accordingly, at time G, when a concurrent request for the bus 154 comes in from the DDC 208, the CPU 160 and the IOCP 300, access to the bus 154 is granted to the DDC 208.

Figure 9:
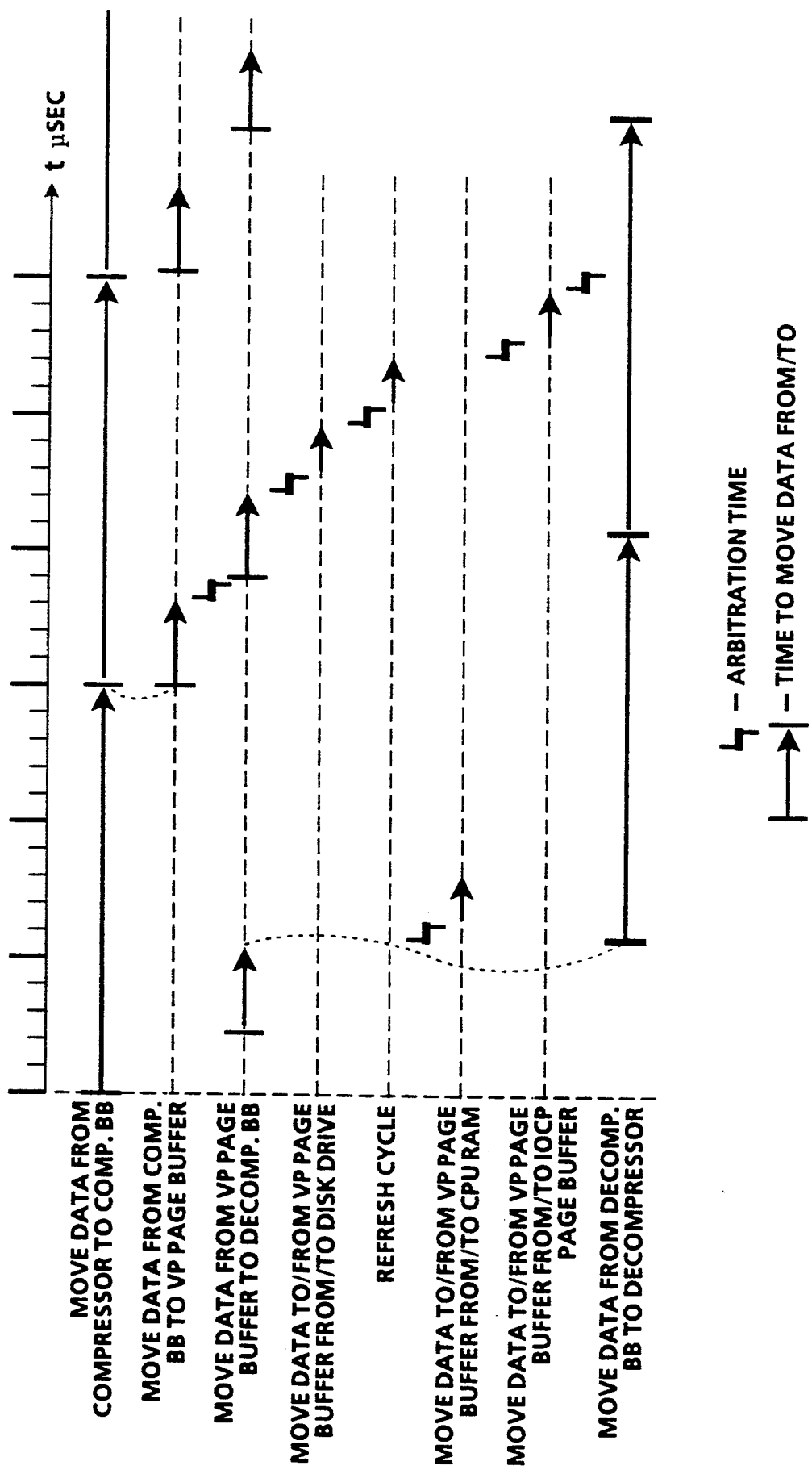
FIG. 9 is a timing diagram demonstrating an exemplary case of operation of the video processor and coprocessor.

Operation of the printing apparatus 10 can be further understood by reference to the exemplary timing diagram FIG. 9. As will be appreciated by those skilled in the many modes of operation, other than the mode of operation discussed below, can be achieved with the various systems and subsystems of the printing apparatus 10 disclosed thus far. To initiate a print job for one or more originals, the parameters of the job, such as number of prints to be made, size of each print, etc., are fed into the UI 130, and the parameters are transmitted accordingly to the CPU 160 by way of bus 134. Prior to transmitting an appropriate scan signal to the scanning section of IIT 12 by way of the IIT UART 246, and a print signal to the IOT interface 46, the CPU 160 communicates with the MAR 156 (FIGS. 3 and 6), by way of data bus 162, to allow for the configuring of addresses in the page buffer 168, the addresses being the 24-bit locations at which image data are stored.

Figure 10:
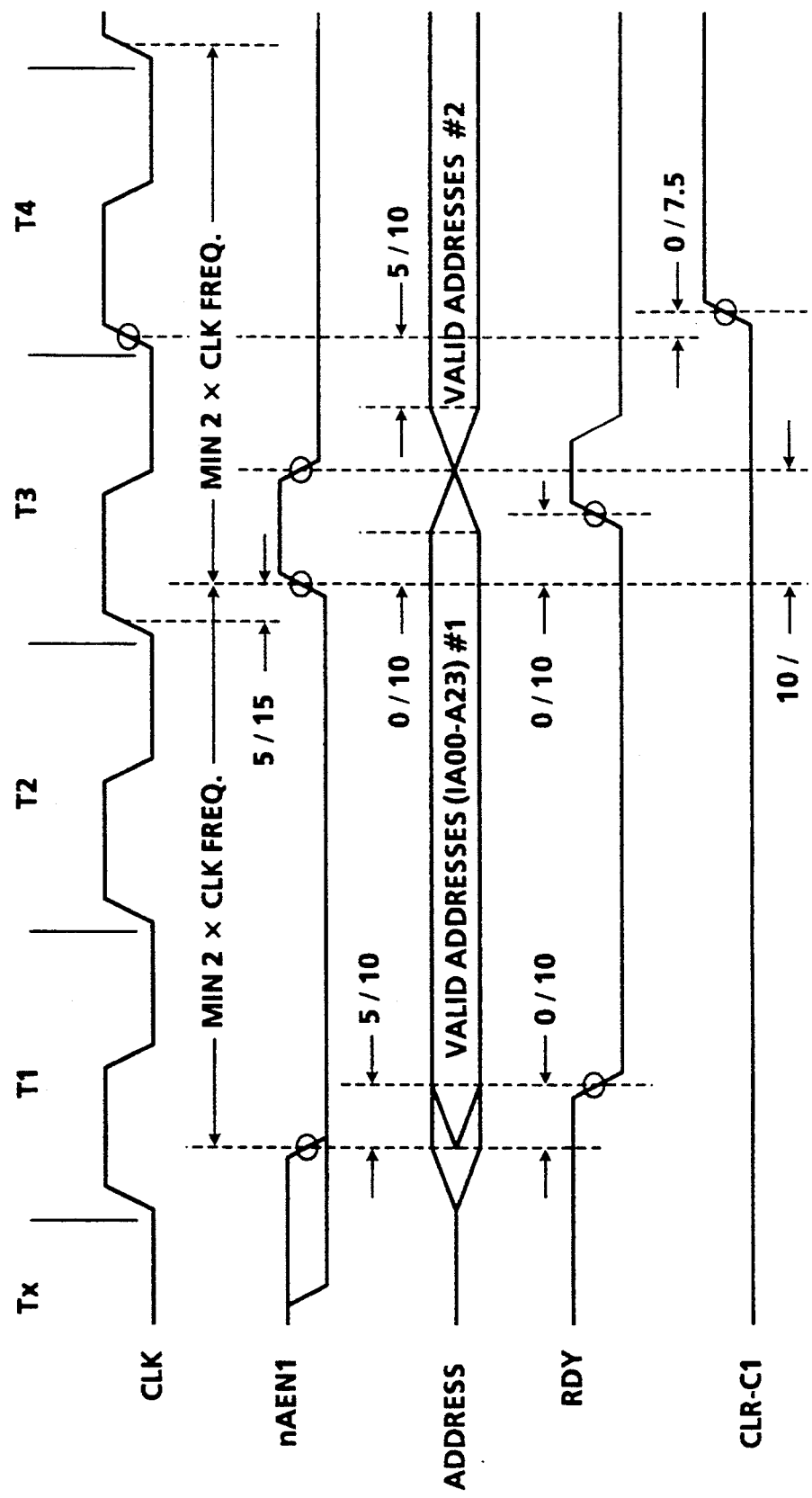
FIG. 10 is a timing diagram demonstrating the use of an address counter to generate addresses for a page buffer.

Upon loading the address counters 178,180 (FIG. 5) and the comparators 182,184 with suitable beginning and finishing addresses, by way of CPU interface 186, the scan signal is transmitted to the scanning section of IIT 12. As each line is scanned, the corresponding image data is transmitted to the IAC 148, by way of the MUX 126, and to the IOT interface 46, by way of the direct data bus 260. Referring again to FIG. 9, each byte of image data transmitted to the IAC 148 is compressed, using the adaptive algorithm of U.S. Pat. No. 4,559,563, and temporarily accumulated in the burst buffer 146. As shown in FIG. 9, image data can be written in or read from the page buffer 168 as image data is being accumulated in the burst buffer 146. Referring to FIGS. 4,5 and 10 it will be understood how a byte of image data is written in the page buffer 168. To move a byte of image data from the burst buffer 146, the IAC 148 seeks access to the bus 154 through the IBA 144.

Assuming that the RF 196 does not need the bus 154, the IBA 144 causes the control logic circuit 158 to synchronously transmit three signals to the IAC 148, the MAR 156 and the page buffer. As a result of the first signal being transmitted to the MAR 156, the enabling signal, nAEN1 goes low and a valid address #1 is "pointed to" by the counter 178. While the counter 178, or what may be thought of as the pointer 178, is at the designated address, the second signal, which is transmitted across control line 150, allows the IAC 148 to access the bus 154 so that the image data byte is transferred to the designated address. In response to the third signal transmitted across line 172, the page buffer 168 stores the byte at the designated address.

After nAEN1 goes low, and the RDY signal goes low, the process can be repeated as many times as may be required to transfer a preselected group of bytes. Each time a byte is transferred to the page buffer 168, the address counter 178 advances to the next address location in the page buffer 168 on the rising edge of nAEN1. If the data in the comparator 182 is equal to the count in the counter 178, CLR-C1 will go active active no later than 7.5 ns after the rising edge of the clock. CLR-C1 will stay active until the address in the counter 178 has been placed onto the output bus 170. Subsequently, when nAEN1 goes high, the counter 178 will be reset.

When the above-described process is repeated for a plurality of bytes, the image data is transferred in a rapid transfer mode known as a burst mode. That is, the above-described pointing or counting arrangement, which is commonly referred to as "direct memory access (DMA)," moves data at rates that far exceed those of conventional microprocessor-controlled arrangements. As will be appreciated by those skilled in the art, DMA allows the CPU 160 to perform a wide variety of system control operations without being interrupted to effect image data transfer.

In the preferred form of operation, up to eight (8) 16-bit bytes are accumulated in the burst buffer 146 of the IAC 148, and after buffering the eighth byte, four of the first-collected bytes are transferred to the page buffer 168 in the burst mode. A similar transfer scheme can be achieved for transferring image to and accumulating image data at the IAD 224. In particular, four bytes of image data can be transferred from the page buffer 168 to the burst buffer 216 of the IAD 222 in a burst mode for accumulation therein. In the meantime, the accumulated image data can be transferred to the IOT interface 46, by way of decompressor 218, at a rate that is substantially less than the burst mode transfer rate.

Referring again to FIG. 9, it will be appreciated that components other than the IAC 148 and the IAD 222 can communicate with the page buffer 168 at time intervals in which image data is not being transferred to and from the page buffer 168 in the burst mode. As shown in FIG. 9 there are at least four intervals in which the page buffer 168 respectively communicates with the CPU 160, the RF 196, the DDC 208 and the IOCP 300 while image data is being accumulated at the burst buffer 146 and/or image data is being transmitted to the IOT interface 46. In one example, image data can be transmitted to the CPU 160 for manipulation thereof, and in another example image data can be stored sequentially in the disk drive 206 for subsequent printing. It will be recognized that use of the disk drive 206 to store image data is preferred when printing of sets of multiple copies is desired. In yet another example, image data can be transferred to/from the page buffer 168 from/to the IOCP 300.

With reference to to the following example, it will be understood how the above-described design of the VP 16 optimizes utilization of the image bus 154, and thus maximizes multi-functionality of the printing apparatus 10. Since the compressor 138 can write image data to the burst buffer 146 at a rate of one (1) 16-bit byte per 700 ns, the burst buffer 146 can accumulate four (4) 16-bit bytes in 2800 ns. Using DMA type transfer, the four bytes can be transferred to the page buffer 168 in 600 ns. Accordingly, during the accumulation period, 2200 ns remain for another I/O device to access the image data bus 154.

The exemplary I/O devices discussed above, other than the IAC 148 and the IAD 222, have the following data transfer rates:

| | |
|---|---|
| CPU 160 | 400 ns/16-bit byte (at 10 MHz clock) |
| RF 196 | 400 ns/16-bit byte |
| DDC 208 | 300 ns/Refresh Cycle |

In view of the above-stated rates, it follows that either the IAC 148 or the IAD 22 as well as the CPU 160, the RF 196 and the DDC 208 can access the bus 154 at least once during the 2800 ns interval in which four bytes are being accumulated in the burst buffer 146.

For the above example, image bus utilization of the image data bus 154 can be calculated relative to the I/O device using the bus 154 with the least frequency. Of the above-mentioned I/O devices, the RF 196, having a refresh cycle of 300 ns every 15000 ns requires the bus 154 with the least frequency, i.e. only 2% of the 15000 ns interval. The DDC 208 requests the bus once every 5000 ns (8% of the 15000 ns interval), and, for a worst case compression ratio of 1:1, either the IAC 148 or the IAD 222 requires a data transfer once every 2800 ns for 600 ns (8% of the 15000 ns interval). Accordingly, the CPU 160 can use the bus as much as 68.57% of the 15000 ns interval. For higher compression rates, which in the preferred embodiment can be as high as 30:1, even more bus access time is made available for either the CPU 160, the RF 196 and the DDC 208. It will be appreciated by those skilled in the art that the relatively high utilization scheme described above permits for advantageous operation of the printing apparatus 10 in that multiple functions, such as data transfer, data manipulation and data storage, can all be performed in a time interval that, at least to the user, seems extremely brief. It will be further appreciated that some of the time given to the CPU 160 to use the bus 154 can be allocated to the IOCP 300 so that it too can access the bus 154 once every 2800 ns.

Figure 11:
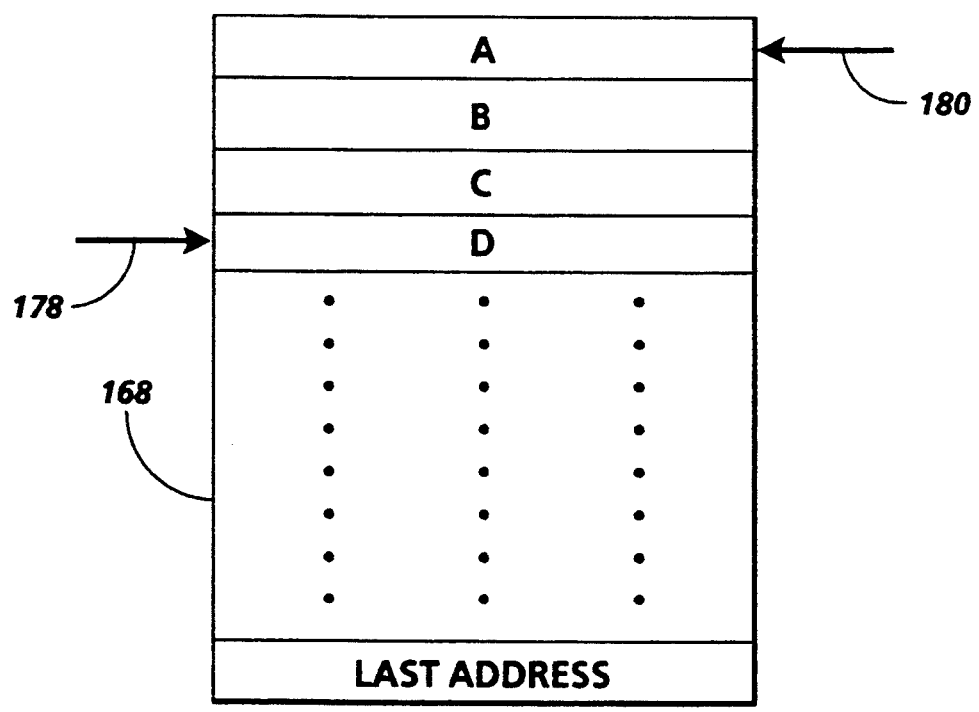
FIG. 11 is a schematic representation demonstrating how two address counters can be used as a dual pointing arrangement for the page buffer.
Figure 12:
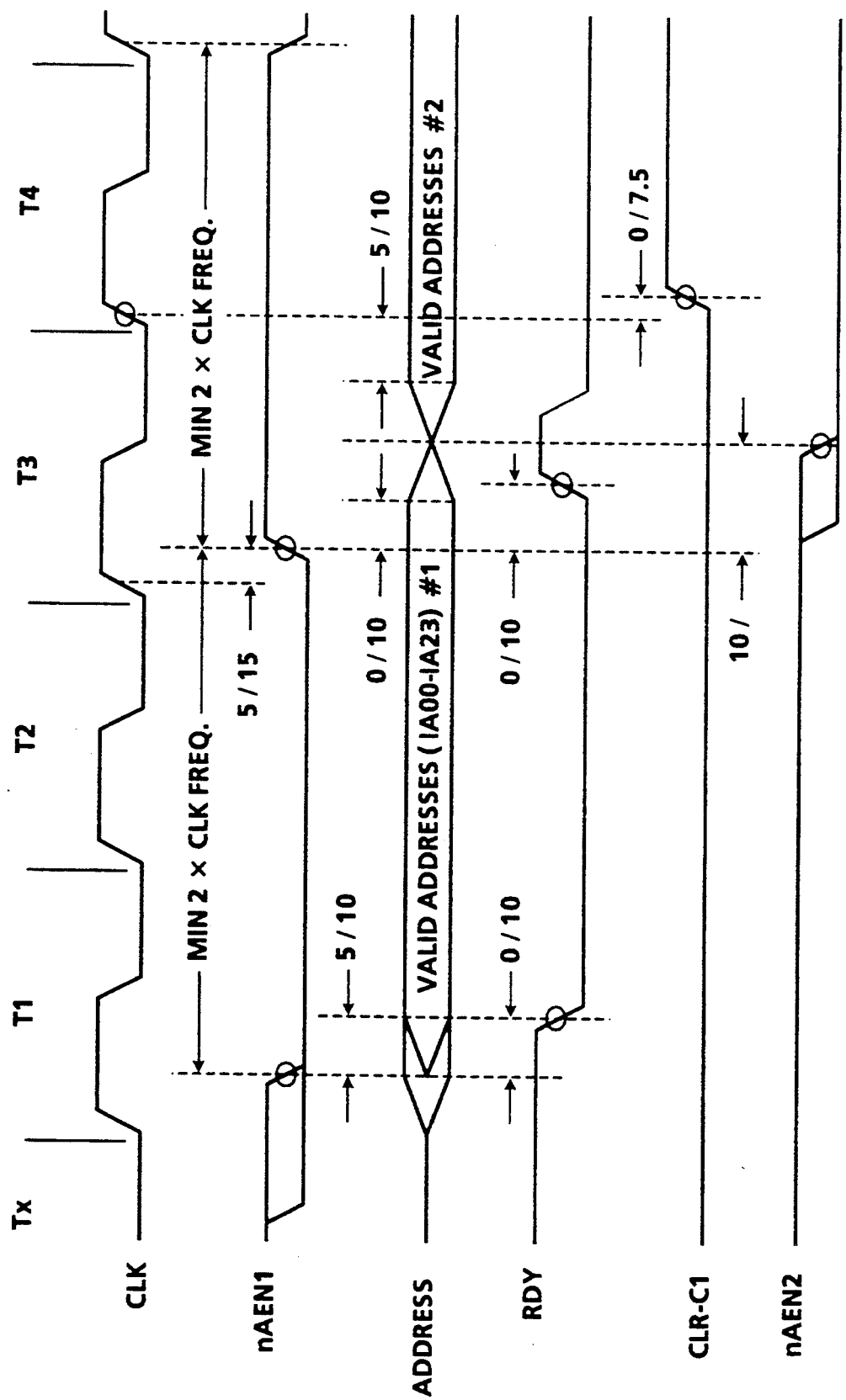
FIG. 12 is a timing diagram demonstrating the use of the dual pointing arrangement of FIG. 11.

Referring to FIGS. 5 and 11-12, features of the MAR 156, that are believed to significantly enhance data transfer operations, are discussed in further detail. In particular, each of counters or pointers 178, 180 (FIG. 5) function as "loop-around pointers" whose movements are respectively limited by the pre-programmed comparators 180,182. Accordingly, respective movement of each of the counters or pointers 178,180 down the stack of the page buffer 168 is limited by the respective settings of the comparators 182,184. Such limiting of the pointers 178, 180 is particularly suitable for those instances in which the user does not intend to overwrite certain data stored further down in the stack Another aspect of the dual pointer arrangement is that image data need not be written into and read out of the page buffer 168 with the same counter. In the illustrated example of FIG. 11, four bytes of image data have been written into the page buffer 168 from the IAC 148 so that the pointer 178 has been moved from the first address "A" to the fourth address "D." If only pointer 178 were available, the image data would be read out of the page buffer 168 by looping the pointer 178 back to address A. With the concept disclosed by the present invention, however, the data at the addresses A-D can be read out using the second pointer 180. As will be appreciated by those skilled in the art, each of pointers 178,180 can be used to designate an address for use in any suitable page buffer operation.

Referring to FIG. 12, a "snapshot" of the pointing arrangement in FIG. 11 is shown. During a first interval the address D can be designated for a data transfer operation with a first I/O device by causing the enabling signal nAEN1 to go low. Subsequently, the address at A can be designated for a data transfer operation with a second I/O device by causing the enabling signal nAEN2 to go low. In one example, the first I/O device could be the IAC 148 with image data being written into the page buffer 168, and the second I/O device could be the IAD 224 with data being read out to the IOT interface 46. In other contemplated examples the I/O devices could be various combinations of the IAC 148, the CPU 160, the RF 196, the DDC 208, the IAD 222 or any like I/O device that could be coupled with the page buffer 168.

Figure 13:
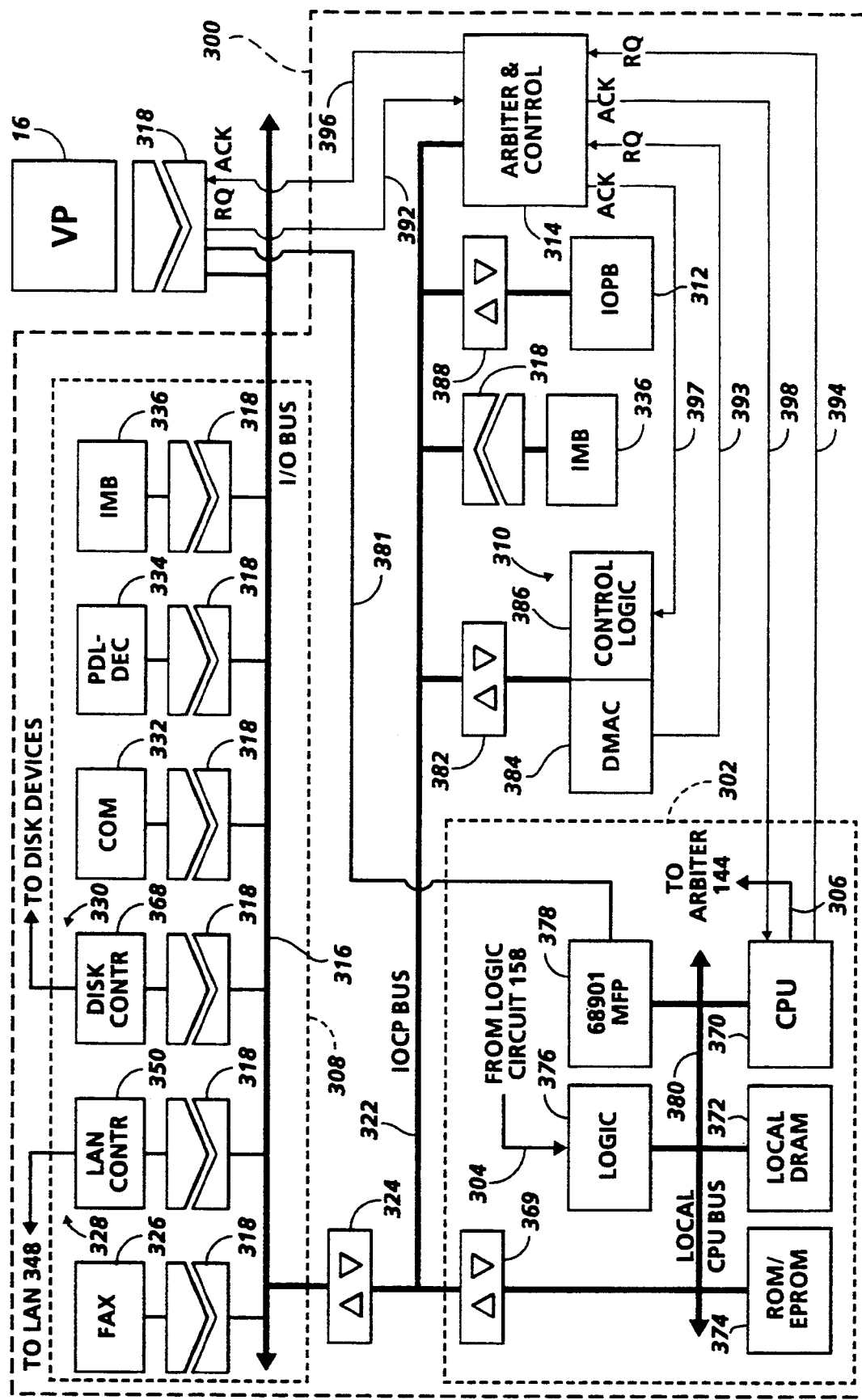
FIG. 13 is a schematic, block diagramatic representation of the coprocessor of the printing machine.

Referring to FIG. 13, the IOCP 300 is described in further detail. Preferably, the IOCP 300 comprises the CPU section 302, Input/Output section 308, DMA 310, Input/Output Page Buffer (IOPB) 312 and Arbiter 314. The Input/Output Section 308 includes a plurality of discrete input/output modules, i.e. input/output cards (IOCs), each of which IOC is coupled with an I/O Bus 316 by way of a suitable connector 318. The I/O Bus 316 couples the IOCP 300 with the VP 16, via I/O interface 317, and is a multipurpose bus which is capable of concurrently transferring data, addresses and control signals. In one example, the I/O bus 316 can possess up to 16 data lines and 24 address lines. In the preferred embodiment, the I/O bus 316 is coupled with the buses 154,232 via the I/O interface 317, and the I/O bus 316 is coupled with an IOCP bus 322 by way of a transceiver or isolation amplifier 324. The IOCP bus 322, a multipurpose bus possessing similar size to that of the I/O bus 316, links the CPU section 302, the DMA 310 and the IOPB 312.

It will be appreciated by those skilled in the art that the dual bus system of the IOCP 300 serves to maximize the fault-tolerance of the IOCP 300. That is, through employment of seperate buses 316,322, the IOCs can communicate with the VP 16, even when the IOCP bus 322 is down, and the components coupled with the IOCP bus 322 can communicate among themselves, even when the I/O bus 316 is down.

For exemplary purposes the discrete modules, each of which includes a dedicated processor or a controller, are shown as a FAX 326, a local area network (LAN) module 328, a disk drive module 330, a communications port (COM) 332, a page description language (PDL)-decomposing (DEC) module 334 and an image manipulation board (IMB) 336. As will be appreciated by those skilled in the art a host of other devices, such as a floppy drive device a keyboard/mouse or a CD ROM could be coupled to the I/O bus 316, as shown in U.S. Pat. No. 4,920,481 (Patentee: Binkley et al.), the relevant portions of which are incorporated herein, for further enhancing the capability of the IOCP 300. The FAX 326 is a conventional group ill type facsimile device, which may be similar in construction to the illustrated FAX of U.S. Pat. No. 5,021,892, the pertinent portions of which patent are incorporated herein by reference. As with the FAX of the '892 patent the FAX 326 may include a transmission control portion (not shown), the control portion containing a slave CPU (not shown) for controlling a data transmission procedure based on a CCITT standard. The control portion is adapted to exchange data with the I/O bus 316 according to the transmission procedure. The control portion can also be connected to a telephone line by way of a modem (not shown) and a network control unit (not shown) as shown in the '892 patent.

Figure 14:
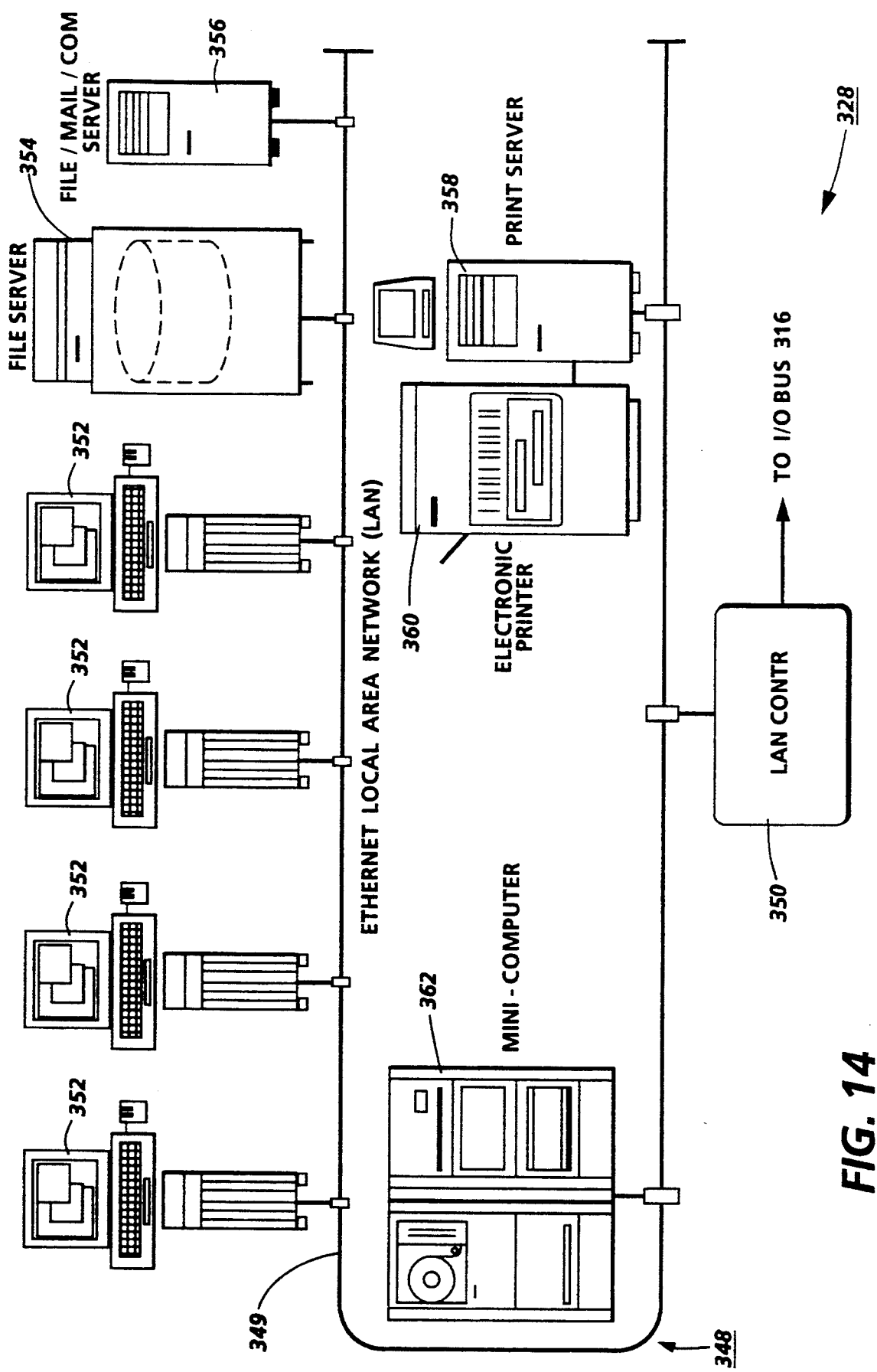
FIG. 14 is a schematic, block diagramatic representation of a local area network arrangement used in conjunction with the coprocessor.

Referring to FIG. 14, the LAN module 328 is shown in further detail. Preferably, the LAN module 328 comprises a LAN system 348 and a controller 350 for interfacing the LAN system 348 with the I/O bus 316. In the illustrated embodiment of FIG. 14, the LAN system 348 includes an Ethernet LAN 349 to which a number of work stations 352 are connected. Workstation 352, may be, for example, the Xerox 6085 professional workstations.

LAN 349 may also have other office connected equipment, such as a network file server 354, a network file mail communication server 356, a print server 358 and an electronic printer 360. Also, a large capacity remote storage facility, such as a mini-computer 362 may be connected to the LAN 349. The LAN system 348 is a collaborative system, meaning that it enables users at different workstations 352 to work together in real-time by processing and passing information among one another and storing and retrieving information from storage services 354 and 362 via the network 349. As will be appreciated by those skilled in the art a fiber distributed data interface (FDDI) could be used in place of or in conjunction with the above-described LAN module 328.

The Disk Drive module 330 (FIG. 13) comprises one or more disk memory devices (not shown), which disk memory devices are coupled with the I/O bus 316 by way of a disk drive controller 368, such as a SCSI controller. The general concepts underlying the structure and operation of the Disk Drive module 330 can be more fully appreciated by reference to FIGS. 3A, 3B and the accompanying discussion of the Disk Drive module 204. The communications port 332, which may, in one example, comprise a Centronics Port and/or a RS 232 allows various components of the IOCP 300 to communicate with peripherals, such as another terminal or printer.

The PDL-DEC module 334 comprises all of the necessary hardware, such as a dedicated processor and suitable registers, to decompose a master PDL file into a bitmap file for printing. As can be appreciated by those skilled in the art, PDLs are an interchange standard for representing documents electronically within a system and ultimately printing those documents. In one example, documents formatted as a PDL file can be exchanged between the work stations 352 of the LAN system 348 and the PDL-DEC module 334 in an efficient and consistent manner. The PDL file describes, among other things, how images are to be rendered on each page, what font is to be employed and how the pages are to be assembled. The PDL-DEC module 334 can receive, as input for printing, electronic documents in various forms, such as POSTSCRIPT, HP-PCL or INTERPRESS.

The image manipulation board (IMB) 336 comprises suitable hardware for achieving such functions as image editing and image conversion. In one example, the hardware may comprise a dedicated processor and a suitably sized bitmap, the bitmap being adapted for use with a large variety of software. The IMB 336 is particularly suited for, among other procedures, wide and small angle rotations, image annotation, or any other known image manipulation processes.

Referring still to FIG. 13, the CPU section 302, which is coupled to the IOCP bus 322 by way of a transceiver 369, comprises a CPU 370, local DRAM 372, ROM/EPROM 374, Logic Section 376 and a Multi-Function Peripheral (MFP) 378, all of which are linked by a multipurpose local bus 380. In the preferred embodiment, the CPU 370 is an 8 MHz Motorola 68000 microprocessor which serves as a bus master for the local bus 380. The CPU 370 has all local, IOCP and I/O bus resources mapped to it, and is responsible for, among other things, performing diagnostics as well as implementing application software and the operating system of the IOCP 300. Preferably, the EPROM 374 is sized at 32K or 64K, and contains power-up diagnostics and a boot program to download the local DRAM 372. The program and data for the CPU 370 is preferably provided by use of 512 KB of zero wait state DRAM. All of the suitable logic that permits the CPU 370 to control IOCP resources, handle interrupts and decode addresses resides in the Logic Section 376. Incoming interrupts are funneled into the MFP 378, which, in one example, is a Motorola 68901 IC. The 68901 includes a serial debug port, which port communicates with the VP 16 by way of line 381. Through use of the debug port and line 381, redundant emergency communication between the VP 16 and the IOCP 300 can be achieved during normal operation of the printing apparatus 10.

The DMA 310, which is coupled to the IOCP bus 322 by way of a transceiver 382, comprises a DMA controller (DMAC) 384 and logic section 386. In the preferred embodiment, the DMAC 384 is an 8 Mhz Siemans 82257 IC possessing a four channel intelligent data transfer engine that enables transfers between the IOCs of the Input/Output section 308 and the IOPB 312 or the IOPB 312 and itself. The DMAC 384 can perform either frequent or infrequent transfers that would be impractical to implement via the CPU 370. For maximum performance, the DMAC 384 has the ability to synchronize its transfers on a cycle by cycle basis with a given data source. Once programmed by the CPU 370, the DMAC 384 can operate without further intervention, and can interrupt the CPU 370 when the DMA 310 transfer is finished. The Siemans 82257 IC is capable of enabling both double cycle (two cycles per data item moved) and single cycle transfers (one cycle per data item moved). The logic section 386, which functions in response to commands from the DMAC 384, is adapted to, among other things, move data and addresses to and from various components of the IOCP 300. In another contemplated embodiment of the present invention, the DMA circuit 142 discussed above, with its MAR 156 and control logic circuit 158, could be used to implement the DMA 310.

Referring still to FIG. 13, the IOPB 312 is preferably a 2 MB DRAM, with an expanded capacity of 4 MB. The IOPB 312, which advantageously permits image buffering, is coupled to the IOCP bus 322 by way of a transceiver 388. Accordingly, the IOPB 312 serves to prevent a slow data producer from wasting resources of the VP 16. In particular, at least one page of image data can be stored in the IOPB 312, manipulated if necessary, and then sent to the VP 16 at a relatively high speed. Additionally, the IOPB 312 can be used as a message communications buffer between the software programs of the VP 16 and the IOCP 300. In the preferred embodiment, the IOPB 312 comprises 16 ( or 32 in an expanded mode) 1 Mb memory chips and control logic.

In the illustrated embodiment of FIG. 13, another IMB board 336 is coupled to the IOCP bus 322. It will be appreciated that a host of intelligent I/O modules, such as the ones described in further detail above, could be coupled to the IOCP bus 322 to further enhance its "data-crunching" capabilities.

Figure 15A:
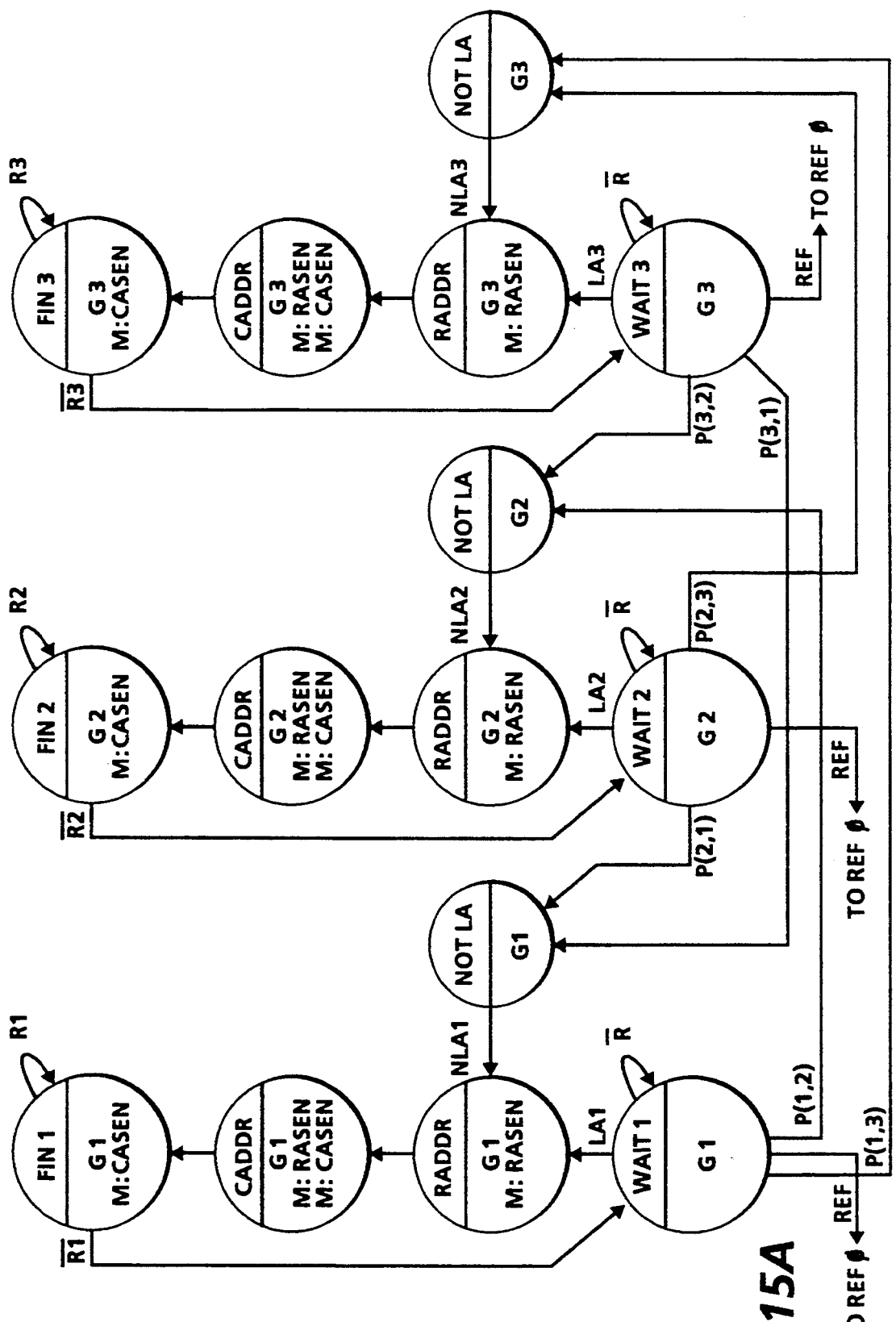
FIGS. 15A–15B comprise a state diagram of a bus arbiter shown in FIG. 13.
Figure 15B:
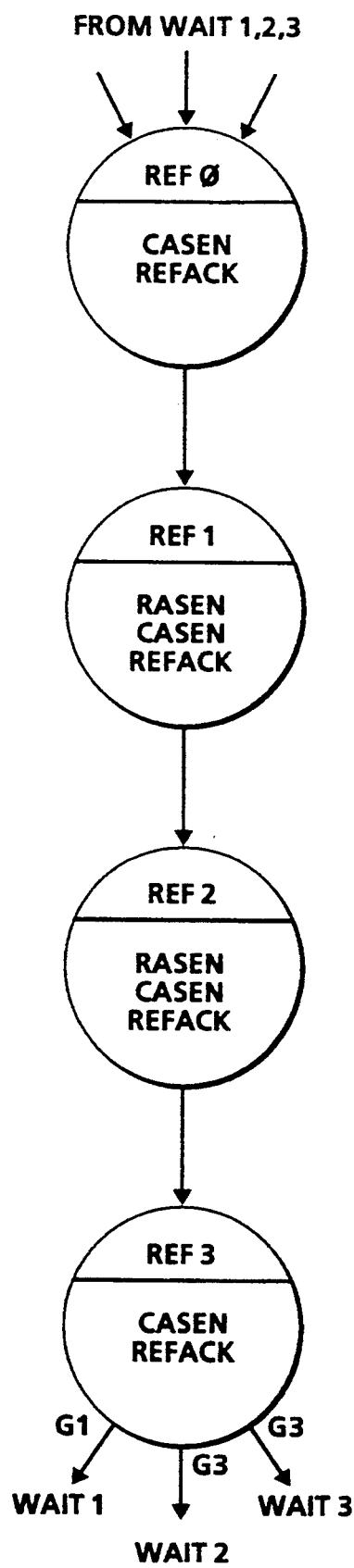

In the preferred embodiment, the arbiter 314 is similar in structure to the arbiter 144 discussed above. Referring to FIGS. 15A–15B, a state diagram for the arbiter 314 is shown. In the preferred embodiment, the VP 16, the CPU 370 and the DMAC 384, are respectively assigned to the states designated as "WAIT 1," "WAIT 2" AND "WAIT 3," respectively. To gain access to the buses 316,322 (FIG. 13), the components respectively transmit request signals across request lines 392–394. All requests are interleaved in a "round-robin" fashion to prevent "deadlock." Additionally, each component using the buses 316,322 has an idle time, so that a component waiting to access the buses 316,322 can be enabled by the arbiter 314 during the idle time of the component currently using the buses 316,322.

Each component seeking access to the buses 316,322, in time, receives an acknowledge signal transmitted by one of lines 396–398, and accesses the buses 316,322. It will be appreciated by those skilled in the art that the round-robin scheme could be modified so that, for example, the CPU 370 would encounter effectively no delay in accessing the bus 316 on account of arbitration. Referring to FIG. 15A, when one of the requesting components is enabled to access the buses 316,322, without requiring the IOPB 312, the component is enabled to proceed through the cycle of states defined by "RADDR," CADDR" and "FIN." When either of the VP 16, the CPU 370 or the DMAC 384 is enabled without requiring memory, RASEN ("RAS ENable") and CASEN ("CAS ENable") are not asserted, and the IOPB 312 is excluded from the data transfer process. When one of the components is enabled and a memory request is required from the IOPB 312, the variables RASEN and CASEN are asserted so that the enabled component is able to facilitate transfers of data.

Figure 16A:
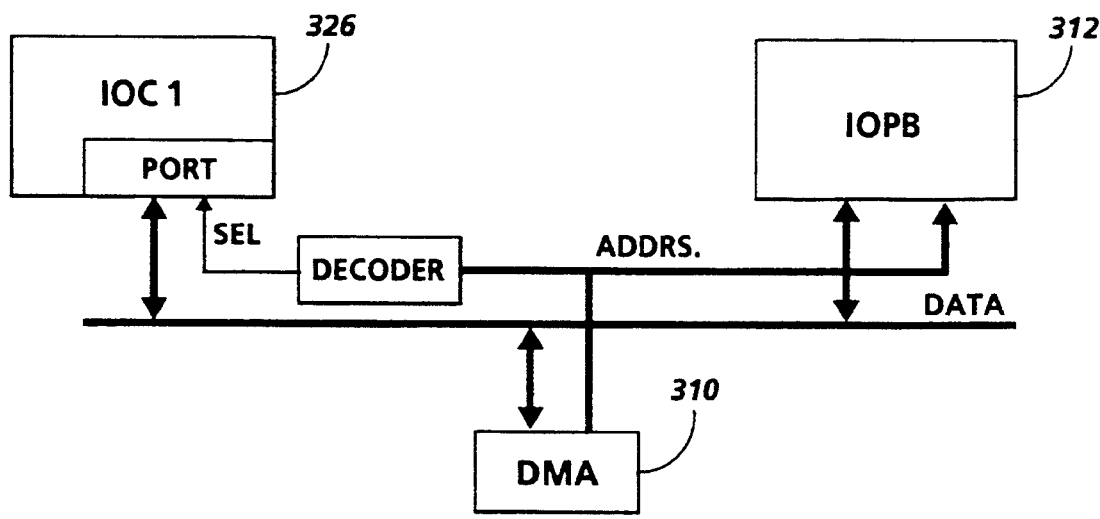
FIG. 16A is a a schematic, block diagramatic representation of an arrangement used to implement a double cycle transfer of data.
Figure 16B:
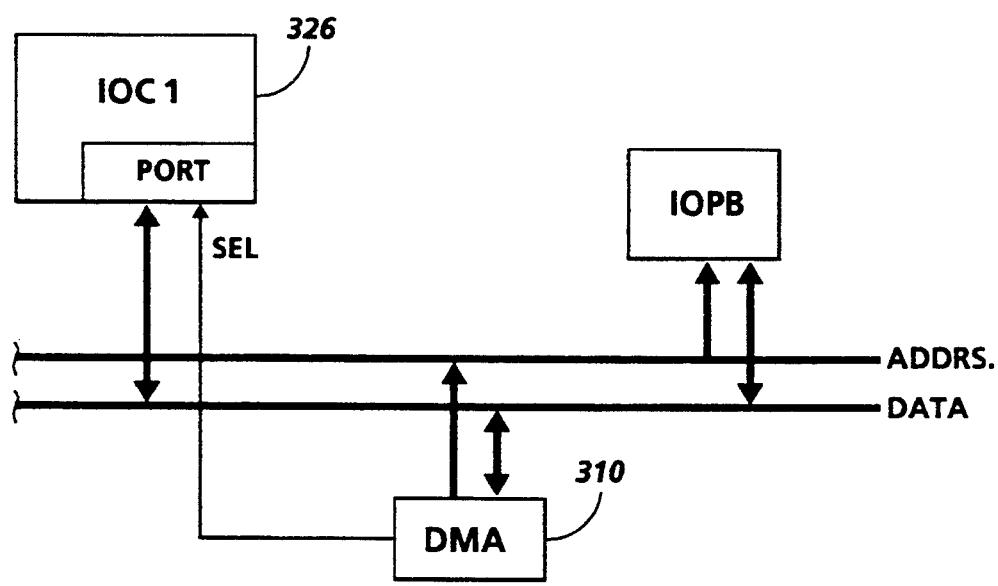
FIG. 16B is a a schematic, block diagramatic representation of an arrangement used to implement a single cycle transfer of data.
Figure 16C:
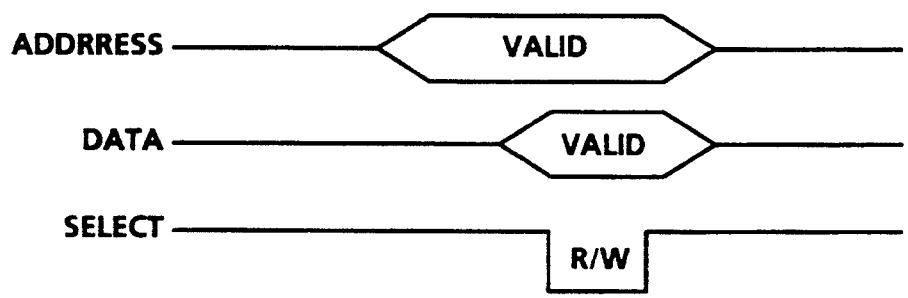
FIG. 16C is a timing diagram demonstrating the single cycle transfer of FIG. 16B.

The distinction between single and double cycle transfers can be best understood by reference to the examples of FIGS. 16A–16B. In one example (FIG. 16A), data is transferred to an IOC of the I/O section 308 from the IOPB 312 by first transmitting an address from the DMAC 384 to the IOPB 312 for retrieving data. The data is then transmitted with a corresponding address by the DMAC 384 to a port of the IOC. Once the address is decoded with a suitable decoder 400, the data is read into the IOC. In another example (FIG. 16B), the DMAC 384 places an address on the address bus and, while the address is valid (FIG. 16C) data is transferred to the IOC by the IOPB 312 and read into the IOC by use of a select signal generated by the DMA 310. As will be recognized by those skilled in the art, while the above example demonstrates a case in which data is written into the IOC, the concept underlying single and double cycle transfers applies with equal force to a case in which data is written into the the IOPB 312 from one of the IOCs.

As noted above, the IOPB 312 is preferably DRAM and requires periodic refreshing. Since refreshing should not be delayed, whenever a refresh signal ("REF") is received by the arbiter 314, a refresh cycle is performed (FIG. 15B) as soon as VP 16, CPU 370 and DMAC 384 are respectively in WAIT 1, WAIT 2 or WAIT 3. As can be noted, the signals RASEN and "REFACK" are asserted in states "REF 0" and "REF 3," while the signals RASEN, CASEN and REFACK are asserted in states "REF 1" and "REF 2." In the preferred embodiment of the present invention, the DRAM has internal refresh counters which are enabled by use of the CAS before RAS refresh cycle of FIG. 15B.

Appropriate inputs, outputs and equations for use with the arbiter 314 and its attendant state diagram follow below:

| INPUTS, OUTPUTS, EQUATIONS AND REGISTER VALUES FOR STATE DIAGRAM OF ARBITER 314 | | | |
|---|---|---|---|
| INPUTS | | | |
| R1 | $<=$ | Request #1 | |
| R2 | $<=$ | Request #2 | |
| R3 | $<=$ | Request #3 | |
| REF | $<=$ | Refresh Request | |
| M | $<=$ | Memory Request | |
| OUTPUTS | | | |
| G1 | $<=$ | Grant #1 | |
| G2 | $<=$ | Grant #2 | |
| G3 | $<=$ | Grant #3 | |
| REFACK | $<=$ | Refresh Ack. | For Memory |
| RASEN | $<=$ | RAS Enable | For Memory |
| CASEN | $<=$ | CAS Enable | For Memory |
| EQUATIONS | | | |
| P(1,2) | $=$ | R2 | *REF |
| P(1,3) | $=$ | R3*$\overline{R2}$ | *REF |
| P(2,1) | $=$ | R1*$\overline{R3}$ | *REF |
| P(2,3) | $=$ | R3 | *REF |
| P(3,1) | $=$ | R1 | *REF |
| P(3,2) | $=$ | R2*$\overline{R1}$ | *REF |
| LA1 | $=$ | R1*$\overline{R2}$*$\overline{R3}$ | *REF |
| LA2 | $=$ | R2*$\overline{R1}$*$\overline{R3}$ | *REF |
| LA3 | $=$ | R3*$\overline{R1}$*$\overline{R2}$ | *REF |
| NLA1 | $=$ | (R2 + R3) | *$\overline{REF}$ |
| NLA2 | $=$ | (R1 + R3) | *$\overline{REF}$ |
| NLA3 | $=$ | (R1 + R2) | *$\overline{REF}$ |

For the above inputs, outputs and equations, standard digital and/or programming notation has been employed whenever possible. It should be noted, however, that the sign "*" designates a boolean "and" function while the sign "+" designates a boolean "or" function. Moreover, it will be appreciated that the state diagram of FIGS. 15A and 15B contains various redundancies, and could thus, in another contemplated embodiment, be simplified.

Figure 17:
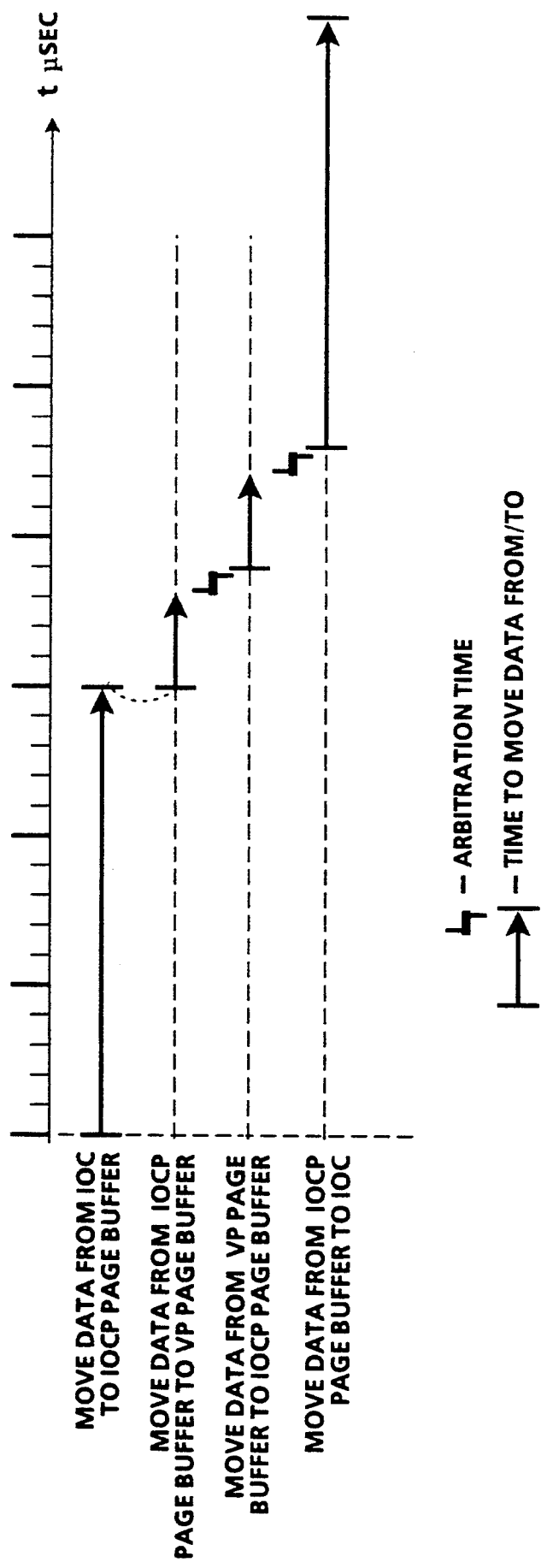
FIG. 17 is a timing diagram demonstrating exemplary cases of image data transfer within the coprocessor and image data transfer between the video processor and the coprocessor.

In operation the IOCP 300 is capable of performing various internal tasks and communicating with the VP 16. Referring to FIG. 17, two examples of operation will be discussed in some detail. In a first example, data is received at one of the IOCs of the input/output section 308, and an interrupt signal is transmitted accordingly to the MFP 378. Assuming that there is space for the data in the IOPB 312, data from the IOC is transmitted to the IOPB 312 by use of the CPU 370 or the DMA 310, and the CPU 370 then requests access to the bus 154, by way of the request line 306. In the meantime the DMAC 384 is programmed by the CPU 370 to transfer the data to the page buffer 168. When the bus 154 is free, an acknowledge signal is transmitted to the logic section 376, by way of line 304, so that the control logic 386 can cause the data to be transferred from the IOPB 312 to the page buffer 168 in a burst mode. It will be appreciated that in this first example of operation, the data can be accumulated at a relatively slow rate in the IOPB 312 without impairing the operation of the VP 16, and, when the VP 16 is ready for the data from the IOPB 312, the data can be transferred at a relatively fast rate so that the VP 16 is not occupied by the relatively slow data rate transfer of the IOC.

In a second example of operation, after data is accumulated in the page buffer 168 (FIGS. 3A-3B and 13), the VP 16 seeks access to the buses 316,322 by way of request line 392. In the meantime the DMA 142 is programmed by the CPU 160 to transfer the data to the IOPB 312. When the buses 316,322 are free, an acknowledge signal is transmitted across line 396 to the VP 16 and the data is transferred to the IOPB 312 in a burst mode by use of the control logic 158. Once the data has been transferred to the IOPB 312, it can be transferred to an appropriate IOC at a rate that is considerably slower than the burst mode rate. It will be appreciated that in this second example of operation, the data can be transferred to the IOCP 300 at a relatively high rate so that the operation of the VP 16 is not unduly occupied with transferring the data to one of the IOCs, the IOCs tending to possess a relatively slow data transfer rate.

It will be recognized that while detailed operation of the IOCP 300 has only been described by way of two examples, those skilled in the art will appreciate the many uses to which the above-described IOCP 300 can be put. For instance while one of the above transfers is being performed, image manipulation can be achieved in either of the IMBs 336. Moreover, since each of the IOCs has its own controller or processor, many operations can be performed within the IOCs while the above transfers are being achieved. Finally, while the DMA 310 is in control of the buses 316,322, the CPU 160 can internally perform a wide variety of tasks.

What is claimed is:

1. A printing machine for concurrently processing first and second sets of image data, comprising:
   a video processing section for processing the first set of image data, including:
      a first bus for transferring the first set of image data thereacross
      an input apparatus, coupled with said first bus, for transmitting the first set of image data, and
      a first page buffer, coupled with said first bus, for receiving the first set of image data from said input apparatus;
   a fault-tolerant coprocessing section coupled with said video processing section, including:
      a second bus for transferring the second set of image data thereacross,
      a plurality of input/output devices, each of said input/output devices being coupled with said second bus,
      a third bus, coupled with said second bus, for transferring the second set of image data thereacross, said third bus being operable notwithstanding the inoperability of said second bus, a second page buffer being coupled with said third bus and adapted to store the second set of image data, said plurality of input/output devices being permitted to communicate among one another when said third bus is inoperative, and means for transferring the second set of image data between a selected one of said plurality of input/output devices and said second page buffer concurrent with the first set of image data being processed in said video processing section, said transferring means transferring the second set of image data in response to receiving a signal from said selected one of said plurality of input/output devices.

2. The printing machine of claim 2, wherein each of said input/output devices comprises a discrete intelligent module.

3. The printing machine of claim 1, wherein said second page buffer is adapted to store at least 2 MB of image data.

4. The printing machine of claim 1, wherein:

said video processing section includes a first processor for selectively controlling transmission of the first set of data within said video processing section; and said transferring means comprises a second processor for selectively controlling transmission of the second set of data between said selected one of said plurality of input/output devices and said second page buffer.

5. The printing machine of claim 4, wherein said transferring means further comprises a programmable direct memory access apparatus selectively controlled by said second processor, said programmable direct memory access apparatus performing data transfer between said selected one of said plurality of input/output devices and said second page buffer independently of said second processor in response to being programmed by said second processor.

6. The printing machine of claim 4, further comprising a fourth bus adapted to transfer image data, addresses and control data thereacross, wherein:

said fourth bus communicates with said second and third buses;

said second processor is coupled with said fourth bus; and said second processor performs local tasks internally by way of said fourth bus.

7. The printing machine of claim 5, further comprising means, coupled with each of said video processing section, said second processor and said programmable direct memory access apparatus, for arbitrating which one of said video processing section, said second processor and said programmable direct memory access apparatus is permitted to access said second bus when said arbitrating means receives request signals concurrently from at least two of said video processing section, said second processor and said programmable direct memory access apparatus.

8. The printing machine of claim 7, in which each of said plurality of input/output devices, said second processor and said programmable direct memory apparatus selectively occupy said second or third bus for a selected time interval, wherein said arbitrating means is programmable so that the selected time interval in which any selected one of said input/output devices, said second processor and said programmable direct memory access apparatus occupies said second or third bus is optimized.

9. The printing machine of claim 7, wherein said arbitrating means and said programmable direct memory access apparatus are synchronized so that at least one byte of the second set of image data is transferred between said selected one of said plurality of input/output devices and said second page buffer in a single cycle process.

10. The printing machine of claim 1, wherein said video processing section further comprises an input buffer, coupled with said input apparatus and said first page buffer, for buffering the first set of image data as it is transmitted from said input apparatus to said first page buffer, wherein said first page buffer is in communication with said second page buffer so that the second set of image data is transferred between said first page buffer and said second page buffer concurrent with the first set of image data from said input apparatus being buffered in said input buffer.

11. The printing machine of claim 10, wherein said transferring means is adapted to transfer the second set of image data to said second page buffer in a burst mode.

12. The printing machine of claim 10, wherein said video processing section includes means, communicating with said input buffer and said transferring means, for arbitrating which one of said input buffer and transferring means is permitted to access said first bus for communicating with said first page buffer when said arbitrating means receives request signals substantially concurrently from said input buffer and said transferring means.

13. The printing machine of claim 1, further comprising an image manipulation module for processing and manipulating the second set of image data concurrent with the first set of image data being processed in said video processing section.

14. A fault-tolerant coprocessing apparatus adapted for use with a video processing section, said fault-tolerant coprocessing apparatus being coupled with the video processing section, the video processing section and said fault-tolerant coprocessing apparatus respectively processing a first set of image data and a second set of image data, said fault-tolerant coprocessing apparatus comprising:

a first bus for transferring the second set of image data thereacross;

a plurality of input/output devices, each of said input/output devices being coupled with said first bus;

a second bus, coupled with said first bus, for transferring the second set of image data thereacross, said second bus being operable notwithstanding the inoperability of said first bus;

a first page buffer being coupled with said second bus and adapted to store the second set of image data, said plurality of input/output devices being permitted to communicate among one another when said third bus is inoperative; and means for transferring the second set of image data between a selected one of said plurality of input/output devices and said first page buffer concurrent with the first set of image data being processed in the video processing section, said transferring means transferring the second set of image data in response to receiving a signal from said selected one of said plurality of input/output devices.

15. The fault-tolerant coprocessing apparatus of claim 14, wherein said first page buffer is adapted to store at least 2 MB of image data.

16. The fault-tolerant coprocessing apparatus of claim 14 wherein the video processing section includes a first processor for selectively controlling transmission of the first set of data within said video processing section, and wherein said transferring means comprises a second processor for selectively controlling transmission of the second set of data between said selected one of said plurality of input/output devices and said first page buffer.

17. The fault-tolerant coprocessing apparatus of claim 16, wherein said transferring means further comprises a programmable direct memory access apparatus selectively controlled by said second processor, said programmable direct memory access apparatus performing data transfer between said selected one of said plurality of input/output devices and said first page buffer independently of said second processor in response to being programmed by said second processor.

18. The fault-tolerant coprocessing apparatus of claim 17, further comprising means, coupled with each of said video processing section, said second processor and said programmable direct memory access apparatus, for arbitrating which one of said video processing section, said second processor and said programmable direct memory access apparatus is permitted to access said first bus when said arbitrating means receives request signals concurrently from at least two of said video processing section, said second processor and said programmable direct memory access apparatus.

19. The fault-tolerant coprocessing apparatus of claim 16, further comprising a multipurpose bus adapted to transfer image data, addresses and control data thereacross, wherein:

said multipurpose bus communicates with said first and second buses;

said second processor is coupled with said multipurpose bus; and said second processor performs local tasks internally by way of said multipurpose bus.

20. The fault-tolerant coprocessing apparatus of claim 14, wherein:

the video processing section comprises:

a multipurpose bus, said multipurpose bus being coupled with said first bus and adapted to transfer the first set of image data thereacross;

an input apparatus, coupled with said multipurpose bus, for transmitting the first set of image data, a second page buffer, coupled with said multipurpose bus, for receiving the first set of image data from said input apparatus, and an input buffer, coupled with said input apparatus and said second page buffer, for buffering the first set of image data as it is transmitted from said input apparatus to said second page buffer; and said first page buffer is in communication with said second page buffer so that the second set of image data is transferred between said first page buffer and said second page buffer concurrent with the first set of image data from said input apparatus being buffered in said input buffer.

21. The coprocessor of claim 14, further comprising an image manipulation module for processing and manipulating the second set of image data concurrent with the first set of image data being processed in said video processing section.

* * * * *